US012461970B2

(12) United States Patent
Noto

(10) Patent No.: US 12,461,970 B2
(45) Date of Patent: Nov. 4, 2025

(54) CATALOG-BASED DATA INHERITANCE DETERMINATION

(71) Applicant: Ancestry.com DNA, LLC, Lehi, UT (US)

(72) Inventor: Keith D. Noto, San Francisco, CA (US)

(73) Assignee: Ancestry.com DNA, LLC

( * ) Notice: Subject to any disclaimer, the term of this patent is extended or adjusted under 35 U.S.C. 154(b) by 138 days.

(21) Appl. No.: 18/235,465

(22) Filed: Aug. 18, 2023

(65) Prior Publication Data

US 2024/0061886 A1  Feb. 22, 2024

Related U.S. Application Data

(60) Provisional application No. 63/371,875, filed on Aug. 19, 2022.

(51) Int. Cl.
*G06F 16/903* (2019.01)
(52) U.S. Cl.
CPC .............................. *G06F 16/90344* (2019.01)
(58) Field of Classification Search
None
See application file for complete search history.

(56) References Cited

U.S. PATENT DOCUMENTS

| | | | |
|---|---|---|---|
| 10,114,922 B2 | 10/2018 | Byrnes et al. | |
| 10,720,229 B2 | 7/2020 | Barber et al. | |
| 2002/0172948 A1* | 11/2002 | Perlin | C12Q 1/6869 |
| | | | 702/20 |
| 2010/0169338 A1 | 7/2010 | Kenedy et al. | |
| 2010/0190264 A1* | 7/2010 | Pericak-Vance | C12Q 1/6883 |
| | | | 436/501 |
| 2010/0223281 A1 | 9/2010 | Hon et al. | |
| 2012/0053845 A1 | 3/2012 | Bruestle et al. | |
| 2014/0025308 A1 | 1/2014 | Jorde et al. | |
| 2014/0067355 A1 | 3/2014 | Noto et al. | |
| 2014/0278138 A1 | 9/2014 | Barber et al. | |
| 2014/0378138 A1 | 12/2014 | Chang et al. | |

(Continued)

OTHER PUBLICATIONS

Browning, S.R. et al., "Identity by Descent Between Distant Relatives: Detection and Applications," Annu. Rev. Genet., 2012, vol. 46, pp. 617-633.

(Continued)

*Primary Examiner* — Kannan Shanmugasundaram
(74) *Attorney, Agent, or Firm* — Fenwick & West LLP

(57) ABSTRACT

A computing server may generate a catalog of overrepresented data strings from a database that stores a plurality of data instances. An overrepresented data string is a data string that matches to a number of data instances and the number exceeds a number threshold. The computing server may receive a target data instance that is to be compared to a related data instance. The computing server may determine one or more matched data strings that match between the target data instance and the related data instance. The computing server may compare the matched data strings to the catalog to exclude a subset of matched data strings that are matched to the overrepresented data strings. The computing server may determine a total length of the matched data strings excluding the subset of matched data strings that are matched to the overrepresented data strings.

20 Claims, 9 Drawing Sheets

(56) References Cited

U.S. PATENT DOCUMENTS

| | | |
|---|---|---|
| 2015/0363481 A1 | 12/2015 | Haynes |
| 2017/0213127 A1 | 7/2017 | Duncan |
| 2017/0220738 A1 | 8/2017 | Barber et al. |
| 2018/0044730 A1 | 2/2018 | Pickrell et al. |
| 2019/0205502 A1 | 7/2019 | Staples et al. |
| 2020/0286591 A1 | 9/2020 | Barber et al. |
| 2021/0034647 A1* | 2/2021 | Nguyen ............... G16B 50/30 |

OTHER PUBLICATIONS

Browning, S.R. et al., "Rapid and Accurate Haplotype Phasing and Missing-Data Inference for Whole-Genome Association Studies by Use of Localized Haplotype Clustering," The American Journal of Human Genetics, Nov. 2007, vol. 81, pp. 1084-1096.

Gusev, A. et al., "The Architecture of Long-Range Haplotypes Shared Within and Across Populations," Mol. Biol. Evol., 2012, vol. 29, No. 2, pp. 473-486.

Gusev, A. et al., "Whole Population, Genome-Wide Mapping of Hidden Relatedness," Genome Research, Feb. 2009, vol. 19, No. 2, pp. 318-326.

Henn, B.M., et al., "Cryptic Distant Relatives Are Common in Both Isolated and Cosmopolitan Genetic Samples," PLoS One, 2D12, vol. 7, No. e34267 (14 pages).

Nelder, J.A et al., "A Simplex Algorithm for Function Minimization," The Computer Journal, Apr. 1964-Jan. 1965, vol. 7, pp. 308-313.

Padhukasahasram, B., "Inferring Ancestry from Population Genomic Data and Its Applications," Frontiers in Genetics, Jul. 3, 2014, vol. 5, pp. 1-5.

Pfeil, M. "What is Data Persistence & Why Does it Matter." Datastax, Oct. 22, 2010, 6 pages, [Online] [Retrieved Feb. 7, 2024], Retrieved from the Internet <URL:https://www.datastax.com/blog/what-persistence-and-why-does-it-matter>.

Purcell, S. et al., "PLINK: a tool set for whole-genome association and population-based linkage analyses," The American Journal of Human Genetics, 2007, vol. 81, No. 3, pp. 559-575.

Sabeti, P.C. et al., "Genome-wide detection and characterization of positive selection in human populations," Nature, 2007, vol. 449, No. 7164, pp. 1-16.

The International Hapmap Consorium, "A second generation human haplotype map of over 3.1 million SNPs," Nature, 2007, vol. 449, No. 164, pp. 1-30.

* cited by examiner

|  | Data Bit Sequence | Frequency |
|---|---|---|
| Window 101: | 101010...101010 | 15,243 |
|  | 111110...101010 | 24,885 |
|  | 101110...111100 | 17,443 |
| Window 102: | 001100...101010 | 15,433 |
|  | 001100...101010 | 32,880 |

|  | Haplotype Sequence | Frequency |
|---|---|---|
| Window 101: | ATATGG...CCCATG | 15,243 |
|  | ATGTAG...CCCATG | 24,885 |
|  | ATAAAT...CCCATG | 17,443 |
| Window 102: | GGAAGG...CTATCG | 15,433 |
|  | TGCAGT...CTATCG | 32,880 |

CATALOG-BASED DATA INHERITANCE DETERMINATION

CROSS-REFERENCE TO RELATED APPLICATION

The present application claims the benefit of U.S. Provisional Patent Application No. 63/371,875 filed on Aug. 19, 2022, which is hereby incorporated by reference in its entirety.

FIELD

This disclosure is related to database management and more specifically to identifying normalized data strings that match two or more data instances.

BACKGROUND

A large-scale database such as a genealogy database can include billions of data records. This type of database may allow users to build family trees, research their family history, and make meaningful discoveries about the lives of their ancestors. Users may try to identify relatives with datasets in the database. However, identifying relatives in the sheer amount of data is not a trivial task. Datasets associated with different individuals may not be connected without a proper determination of how the datasets are related. Comparing a large number of datasets without a concrete strategy may also be computationally infeasible because each dataset may also include a large number of data bits. Given an individual dataset and a database with datasets that are potentially related to the individual dataset, it is often challenging to identify a dataset in the database that is associated with the individual dataset.

Data may be inherited and evolved based on real-world events that are not always recorded or documented. Yet, while the real-world events may not be completely documented, the change and inheritance of those events may be traceable through the change among data instances. For example, two data instances may be generated independently and individually reflect the status of two events, the natures or characteristics of two apparently unrelated named entities, or any combination of natures. However, the two data instances or corresponding events or named entities may be inherited from one or more common sources so that the two data instances share some similarities in the data.

SUMMARY

Disclosed herein relates to a computer-implemented method for determining a normalized data inheritance between two data instances may include: generating a catalog of overrepresented data strings from a database that stores a plurality of data instances, wherein An overrepresented data string is a data string that matches to a number of data instances and the number exceeds a number threshold; receiving a target data instance that is to be compared to a related data instance; determining one or more matched data strings that match between the target data instance and the related data instance; comparing the matched data strings to the catalog to exclude a subset of matched data strings that are matched to the overrepresented data strings; determining the normalized data inheritance between the target data instance and the related data instance, the normalized data inheritance corresponding to a total length of the matched data strings excluding the subset of matched data strings that are matched to the overrepresented data strings; and storing, responsive to the total length being longer than a length threshold, information regarding the target data instance and the related data instance being a pair of matches.

In some embodiments, the overrepresented data strings in the catalog are arranged by windows of data locality within which the overrepresented data strings are located.

In some embodiments, the catalog includes a plurality of overrepresented data strings in one of the windows of data locality.

In some embodiments, generating the catalog includes: receiving the plurality of data instances that correspond to named entities, wherein each of the plurality of data instances is phased; dividing each data instance into a plurality of windows of data locality; tallying, for each window, the phased data instance that has a particular data bit sequence; and determining whether a tally of the particular data bit sequence exceeds the number threshold.

In some embodiments, information regarding the target data instance and the related data instance being a pair of matches includes the total length and an indication that the target data instance and the related data instance are related by inheritance of a real-life event.

In some embodiments, the catalog is generated before receiving the target data instance and is stored in a second database.

In some embodiments, comparing the matched data strings to the catalog to exclude the subset of matched data strings that are matched to the overrepresented data strings includes: dividing the target data instance into a plurality of windows of data locality; receiving, from the catalog, a subset of the windows that include the overrepresented data strings; and comparing the target data instance and the related data instance in the windows that are not under the subset.

In some embodiments, determining one or more matched data strings that match between the target data instance and the related data instance is based on one or more weak matches of data strings.

In some embodiments, determining one or more matched data strings that match between the target data instance and the related data instance includes: phasing the target data instance into a pair of data sequences; comparing the pair of data sequences with data sequences in the related data instance.

In some embodiments, the database that stores the plurality of data instances includes over 10,000 data instances and each data instance includes over 10,000 data bits.

In some embodiments, a non-transitory computer-readable medium that is configured to store instructions is described. The instructions, when executed by one or more processors, cause the one or more processors to perform a process that includes steps described in the above computer-implemented methods or described in any embodiments of this disclosure. In some embodiments, a system may include one or more processors and a storage medium that is configured to store instructions. The instructions, when executed by one or more processors, cause the one or more processors to perform a process that includes steps described in the above computer-implemented methods or described in any embodiments of this disclosure.

BRIEF DESCRIPTION OF THE DRAWINGS

FIG. 5A is a conceptual diagram illustrating an example of the catalog, in accordance with some embodiments.

FIG. 5B is a conceptual diagram illustrating an example of the catalog, in accordance with some embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures (FIGs.) and the following description relate to preferred embodiments by way of illustration only. One of skill in the art may recognize alternative embodiments of the structures and methods disclosed herein as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Data may be inherited and evolved based on real-world events that are not always recorded or documented. Yet, while the real-world events may not be completely documented, the change and inheritance of those events may be traceable through the change among data instances. For example, two data instances may be generated independently and individually reflect the status of two events, the natures or characteristics of two apparently unrelated named entities, or any combination of natures. However, the two data instances or corresponding events or named entities may be inherited from one or more common sources so that the two data instances share some similarities in the data. As such, the nature of inheritance may be revealed by analyzing and comparing the two data instances. In some cases, however, there are locations in the data where many data instances all share the same or very similar data bits. Those locations may be overrepresented in a database of data instances and may not carry any significance in determining how two data instances are related. For example, those locations may be common building blocks of data instances or are inherited as a result of a widely common event that does not bear sufficient significance in distinguishing whether two data instances are in fact related or unrelated. Various example embodiments described herein provide solutions to determine a normalized data inheritance between two data instances that determine the matching of data bits in the two instances while removing (normalizing) commonly matched bits that are too common in other data instances.

Example System Environment

Figure 1:
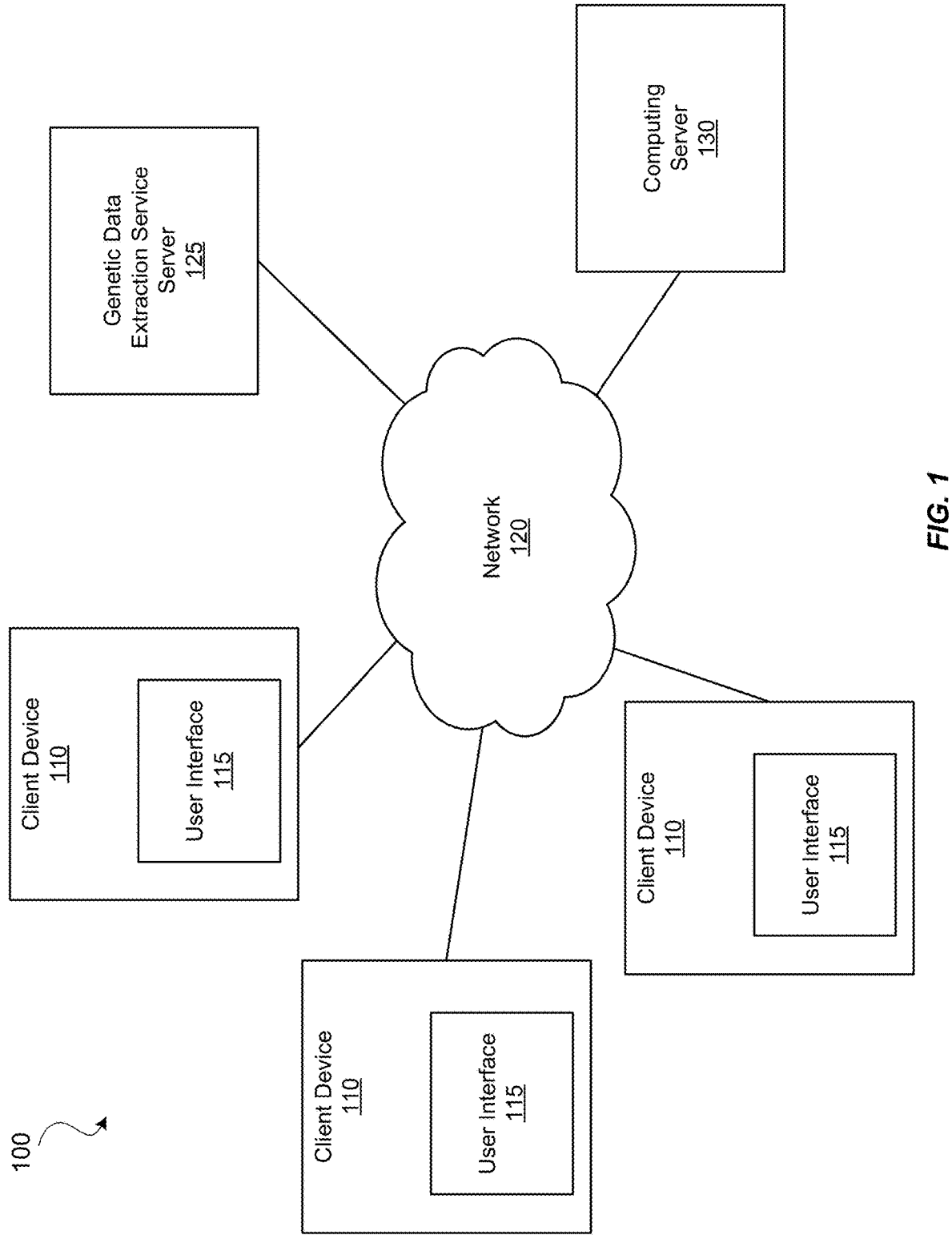
FIG. 1 illustrates a diagram of a system environment of an example computing system, in accordance with some embodiments.

FIG. 1 illustrates a diagram of a system environment 100 of an example computing server 130, in accordance with some embodiments. The system environment 100 shown in FIG. 1 includes one or more client devices 110, a network 120, a genetic data extraction service server 125, and a computing server 130. In various embodiments, the system environment 100 may include fewer or additional components. The system environment 100 may also include different components.

The client devices 110 are one or more computing devices capable of receiving user input as well as transmitting and/or receiving data via a network 120. Example computing devices include desktop computers, laptop computers, personal digital assistants (PDAs), smartphones, tablets, wearable electronic devices (e.g., smartwatches), smart household appliances (e.g., smart televisions, smart speakers, smart home hubs), Internet of Things (IoT) devices or other suitable electronic devices. A client device 110 communicates to other components via the network 120. Users may be customers of the computing server 130 or any individuals who access the system of the computing server 130, such as an online website or a mobile application. In some embodiments, a client device 110 executes an application that launches a graphical user interface (GUI) for a user of the client device 110 to interact with the computing server 130. The GUI may be an example of a user interface 115. A client device 110 may also execute a web browser application to enable interactions between the client device 110 and the computing server 130 via the network 120. In another embodiment, the user interface 115 may take the form of a software application published by the computing server 130 and installed on the user device 110. In yet another embodiment, a client device 110 interacts with the computing server 130 through an application programming interface (API) running on a native operating system of the client device 110, such as IOS or ANDROID.

The network 120 provides connections to the components of the system environment 100 through one or more sub-networks, which may include any combination of local area and/or wide area networks, using both wired and/or wireless communication systems. In some embodiments, a network 120 uses standard communications technologies and/or protocols. For example, a network 120 may include communication links using technologies such as Ethernet, 802.11, worldwide interoperability for microwave access (WiMAX), 3G, 4G, Long Term Evolution (LTE), 5G, code division multiple access (CDMA), digital subscriber line (DSL), etc. Examples of network protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 120 may be represented using any suitable format, such as hypertext markup language (HTML) or extensible markup language (XML). In some embodiments, all or some of the communication links of a network 120 may be encrypted using any suitable technique or techniques such as secure sockets layer (SSL), transport layer security (TLS), virtual private networks (VPNs), Internet Protocol security (IPsec), etc. The network 120 also includes links and packet switching networks such as the Internet.

Individuals, who may be customers of a company operating the computing server 130, provide biological samples for analysis of their genetic data. Individuals may also be referred to as users. In some embodiments, an individual uses a sample collection kit to provide a biological sample (e.g., saliva, blood, hair, tissue) from which genetic data is extracted and determined according to nucleotide processing techniques such as amplification and sequencing. Amplification may include using polymerase chain reaction (PCR) to amplify segments of nucleotide samples. Sequencing may include sequencing of deoxyribonucleic acid (DNA) sequencing, ribonucleic acid (RNA) sequencing, etc. Suitable sequencing techniques may include Sanger sequencing and massively parallel sequencing such as various next-generation sequencing (NGS) techniques including whole genome sequencing, pyrosequencing, sequencing by synthesis, sequencing by ligation, and ion semiconductor sequencing. In some embodiments, a set of SNPs (e.g., 300,000) that are shared between different array platforms (e.g., Illumina OmniExpress Platform and Illumina HumanHap 650Y Platform) may be obtained as genetic data. Genetic data extraction service server 125 receives biological samples from users of the computing server 130. The genetic data extraction service server 125 performs sequencing of the biological samples and determines the base pair sequences of the individuals. The genetic data extraction service server 125 generates the genetic data of the individuals based on the sequencing results. The genetic data may include data sequenced from DNA or RNA and may include base pairs from coding and/or noncoding regions of DNA.

The genetic data may take different forms and include information regarding various biomarkers of an individual. For example, in some embodiments, the genetic data may be the base pair sequence of an individual. The base pair sequence may include the whole genome or a part of the genome such as certain genetic loci of interest. In another embodiment, the genetic data extraction service server 125 may determine genotypes from sequencing results, for example by identifying genotype values of single nucleotide polymorphisms (SNPs) present within the DNA. The results in this example may include a sequence of genotypes corresponding to various SNP sites. A SNP site may also be referred to as a SNP loci. A genetic locus is a segment of a genetic sequence. A locus can be a single site or a longer stretch. The segment can be a single base long or multiple bases long. In some embodiments, the genetic data extraction service server 125 may perform data pre-processing of the genetic data to convert raw sequences of base pairs to sequences of genotypes at target SNP sites. Since a typical human genome may differ from a reference human genome at only several million SNP sites (as opposed to billions of base pairs in the whole genome), the genetic data extraction service server 125 may extract only the genotypes at a set of target SNP sites and transmit the extracted data to the computing server 130 as the genetic dataset of an individual. SNPs, base pair sequence, genotype, haplotype, RNA sequences, protein sequences, and phenotypes are examples of biomarkers. In some embodiments, each SNP site may have two readings that are heterozygous.

The computing server 130 performs various analyses of the genetic data, genealogy data, and users' survey responses to generate results regarding the phenotypes and genealogy of users of computing server 130. Depending on the embodiments, the computing server 130 may also be referred to as an online server, a personal genetic service server, a genealogy server, a family tree building server, and/or a social networking system. The computing server 130 receives genetic data from the genetic data extraction service server 125 and stores the genetic data in the data store of the computing server 130. The computing server 130 may analyze the data to generate results regarding the genetics or genealogy of users. The results regarding the genetics or genealogy of users may include the ethnicity compositions of users, paternal and maternal genetic analysis, identification or suggestion of potential family relatives, ancestor information, analyses of DNA data, potential or identified traits such as phenotypes of users (e.g., diseases, appearance traits, other genetic characteristics, and other non-genetic characteristics including social characteristics), etc. The computing server 130 may present or cause the user interface 115 to present the results to the users through a GUI displayed at the client device 110. The results may include graphical elements, textual information, data, charts, and other elements such as family trees.

In some embodiments, the computing server 130 also allows various users to create one or more genealogical profiles of the user. The genealogical profile may include a list of individuals (e.g., ancestors, relatives, friends, and other people of interest) who are added or selected by the user or suggested by the computing server 130 based on the genealogical records and/or genetic records. The user interface 115 controlled by or in communication with the computing server 130 may display the individuals in a list or as a family tree such as in the form of a pedigree chart. In some embodiments, subject to user's privacy setting and authorization, the computing server 130 may allow information generated from the user's genetic dataset to be linked to the user profile and to one or more of the family trees. The users may also authorize the computing server 130 to analyze their genetic dataset and allow their profiles to be discovered by other users.

Example Computing Server Architecture

Figure 2:
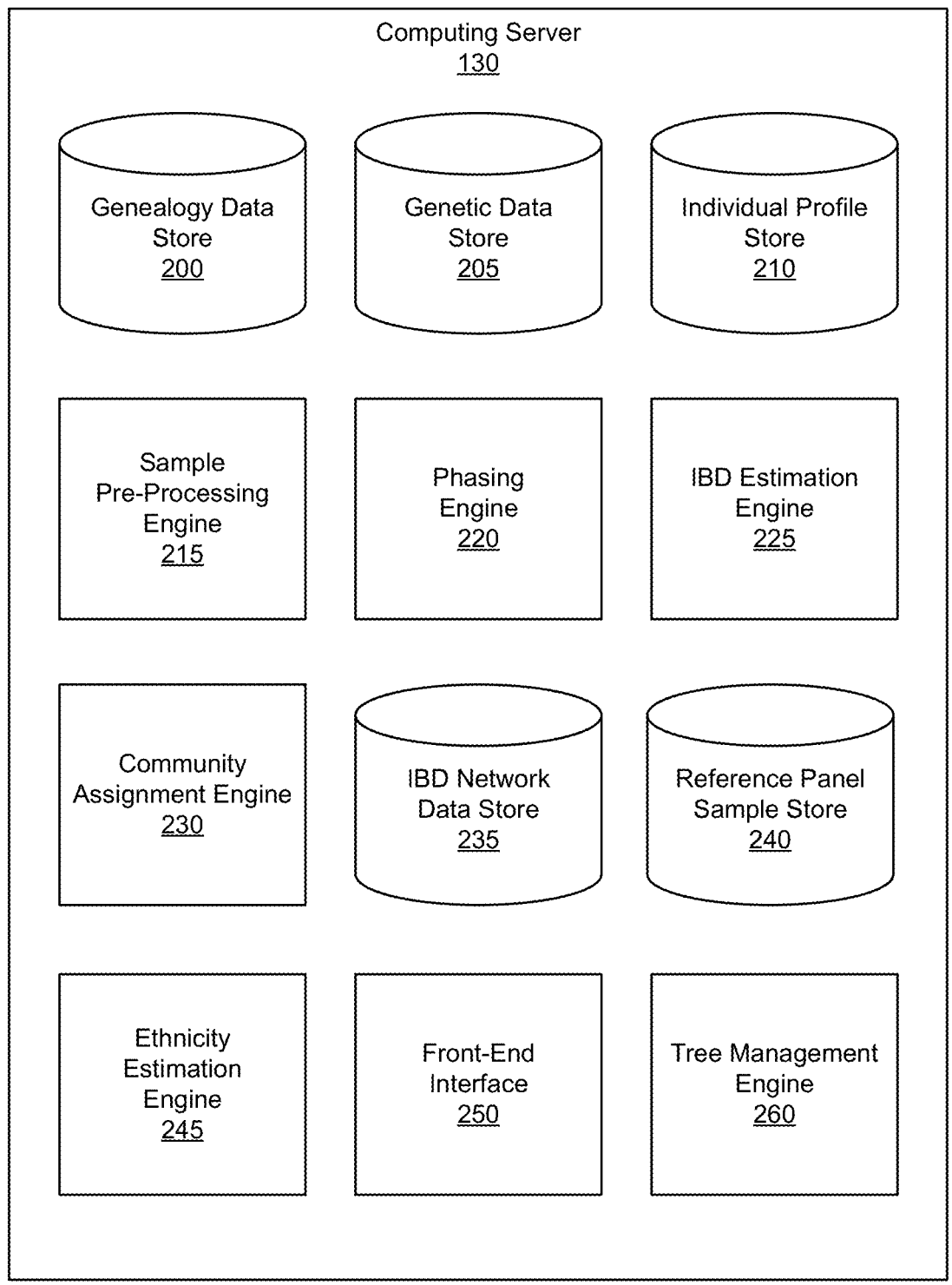
FIG. 2 is a block diagram of an architecture of an example computing system, in accordance with some embodiments.

FIG. 2 is a block diagram of an architecture of an example computing server 130, in accordance with some embodiments. In the embodiment shown in FIG. 2, the computing server 130 includes a genealogy data store 200, a genetic data store 205, an individual profile store 210, a sample pre-processing engine 215, a phasing engine 220, an identity by descent (IBD) estimation engine 225, a community assignment engine 230, an IBD network data store 235, a reference panel sample store 240, an ethnicity estimation engine 245, a front-end interface 250, and a tree management engine 260. The functions of the computing server 130 may be distributed among the elements in a different manner than described. In various embodiments, the computing server 130 may include different components and fewer or additional components. Each of the various data stores may be a single storage device, a server controlling multiple storage devices, or a distributed network that is accessible through multiple nodes (e.g., a cloud storage system).

The computing server 130 stores various data of different individuals, including genetic data, genealogy data, and survey response data. The computing server 130 processes the genetic data of users to identify shared identity-by-descent (IBD) segments between individuals. The genealogy data and survey response data may be part of user profile data. The amount and type of user profile data stored for each user may vary based on the information of a user, which is provided by the user as she creates an account and profile at a system operated by the computing server 130 and continues to build her profile, family tree, and social network at the system and to link her profile with her genetic data. Users may provide data via the user interface 115 of a client device 110. Initially and as a user continues to build her genealogical profile, the user may be prompted to answer questions related to the basic information of the user (e.g., name, date of birth, birthplace, etc.) and later on more advanced questions that may be useful for obtaining additional genealogy data. The computing server 130 may also include survey questions regarding various traits of the users such as the users' phenotypes, characteristics, preferences, habits, lifestyle, environment, etc.

Genealogy data may be stored in the genealogy data store 200 and may include various types of data that are related to tracing family relatives of users. Examples of genealogy data include names (first, last, middle, suffixes), gender, birth locations, date of birth, date of death, marriage information, spouse's information kinships, family history, dates and places for life events (e.g., birth and death), other vital data, and the like. In some instances, family history can take the form of a pedigree of an individual (e.g., the recorded relationships in the family). The family tree information associated with an individual may include one or more specified nodes. Each node in the family tree represents the individual, an ancestor of the individual who might have passed down genetic material to the individual, and the individual's other relatives including siblings, cousins, and offspring in some cases. Genealogy data may also include connections and relationships among users of the computing server 130. The information related to the connections among a user and her relatives that may be associated with a family tree may also be referred to as pedigree data or family tree data.

In addition to user-input data, genealogy data may also take other forms that are obtained from various sources such as public records and third-party data collectors. For example, genealogical records from public sources include birth records, marriage records, death records, census records, court records, probate records, adoption records, obituary records, etc. Likewise, genealogy data may include data from one or more family trees of an individual, the Ancestry World Tree system, a Social Security Death Index database, the World Family Tree system, a birth certificate database, a death certificate database, a marriage certificate database, an adoption database, a draft registration database, a veterans database, a military database, a property records database, a census database, a voter registration database, a phone database, an address database, a newspaper database, an immigration database, a family history records database, a local history records database, a business registration database, a motor vehicle database, and the like.

Furthermore, the genealogy data store 200 may also include relationship information inferred from the genetic data stored in the genetic data store 205 and information received from the individuals. For example, the relationship information may indicate which individuals are genetically related, how they are related, how many generations back they share common ancestors, lengths and locations of IBD segments shared, which genetic communities an individual is a part of, variants carried by the individual, and the like.

The computing server 130 maintains genetic datasets of individuals in the genetic data store 205. A genetic dataset of an individual may be a digital dataset of nucleotide data (e.g., SNP data) and corresponding metadata. A genetic dataset may contain data on the whole or portions of an individual's genome. The genetic data store 205 may store a pointer to a location associated with the genealogy data store 200 associated with the individual. A genetic dataset may take different forms. In some embodiments, a genetic dataset may take the form of a base pair sequence of the sequencing result of an individual. A base pair sequence dataset may include the whole genome of the individual (e.g., obtained from a whole-genome sequencing) or some parts of the genome (e.g., genetic loci of interest).

In another embodiment, a genetic dataset may take the form of sequences of genetic markers. Examples of genetic markers may include target SNP sites (e.g., allele sites) filtered from the sequencing results. A SNP site that is single base pair long may also be referred to a SNP locus. A SNP site may be associated with a unique identifier. The genetic dataset may be in a form of diploid data that includes a sequencing of genotypes, such as genotypes at the target SNP site, or the whole base pair sequence that includes genotypes at known SNP site and other base pair sites that are not commonly associated with known SNPs. The diploid dataset may be referred to as a genotype dataset or a genotype sequence. Genotype may have a different meaning in various contexts. In one context, an individual's genotype may refer to a collection of diploid alleles of an individual. In other contexts, a genotype may be a pair of alleles present on two chromosomes for an individual at a given genetic marker such as a SNP site.

Genotype data for a SNP site may include a pair of alleles. The pair of alleles may be homozygous (e.g., A-A or G-G) or heterozygous (e.g., A-T, C-T). Instead of storing the actual nucleotides, the genetic data store 205 may store genetic data that are converted to bits. For a given SNP site, oftentimes only two nucleotide alleles (instead of all 4) are observed. As such, a 2-bit number may represent a SNP site. For example, 00 may represent homozygous first alleles, 11 may represent homozygous second alleles, and 01 or 10 may represent heterozygous alleles. A separate library may store what nucleotide corresponds to the first allele and what nucleotide corresponds to the second allele at a given SNP site.

A diploid dataset may also be phased into two sets of haploid data, one corresponding to a first parent side and another corresponding to a second parent side. The phased datasets may be referred to as haplotype datasets or haplotype sequences. Similar to genotype, haplotype may have a different meaning in various contexts. In one context, a haplotype may also refer to a collection of alleles that corresponds to a genetic segment. In other contexts, a haplotype may refer to a specific allele at a SNP site. For example, a sequence of haplotypes may refer to a sequence of alleles of an individual that are inherited from a parent.

The individual profile store 210 stores profiles and related metadata associated with various individuals appeared in the computing server 130. A computing server 130 may use unique individual identifiers to identify various users and other non-users that might appear in other data sources such as ancestors or historical persons who appear in any family tree or genealogy database. A unique individual identifier may be a hash of certain identification information of an individual, such as a user's account name, user's name, date of birth, location of birth, or any suitable combination of the information. The profile data related to an individual may be stored as metadata associated with an individual's profile. For example, the unique individual identifier and the metadata may be stored as a key-value pair using the unique individual identifier as a key.

An individual's profile data may include various kinds of information related to the individual. The metadata about the individual may include one or more pointers associating genetic datasets such as genotype and phased haplotype data of the individual that are saved in the genetic data store 205. The metadata about the individual may also be individual information related to family trees and pedigree datasets that include the individual. The profile data may further include declarative information about the user that was authorized by the user to be shared and may also include information inferred by the computing server 130. Other examples of information stored in a user profile may include biographic, demographic, and other types of descriptive information such as work experience, educational history, gender, hobbies, or preferences, location and the like. In some embodiments, the user profile data may also include one or more photos of the users and photos of relatives (e.g., ancestors) of the users that are uploaded by the users. A user may authorize the computing server 130 to analyze one or more photos to extract information, such as the user's or relative's appearance traits (e.g., blue eyes, curved hair, etc.), from the photos. The appearance traits and other information extracted from the photos may also be saved in the profile store. In some cases, the computing server may allow users to upload many different photos of the users, their relatives, and even friends. User profile data may also be obtained from other suitable sources, including historical records (e.g., records related to an ancestor), medical records, military records, photographs, other records indicating one or more traits, and other suitable recorded data.

For example, the computing server 130 may present various survey questions to its users from time to time. The responses to the survey questions may be stored at individual profile store 210. The survey questions may be related to various aspects of the users and the users' families. Some survey questions may be related to users' phenotypes, while other questions may be related to environmental factors of the users.

Survey questions may concern health or disease-related phenotypes, such as questions related to the presence or absence of genetic diseases or disorders, inheritable diseases or disorders, or other common diseases or disorders that have a family history as one of the risk factors, questions regarding any diagnosis of increased risk of any diseases or disorders, and questions concerning wellness-related issues such as a family history of obesity, family history of causes of death, etc. The diseases identified by the survey questions may be related to single-gene diseases or disorders that are caused by a single-nucleotide variant, an insertion, or a deletion. The diseases identified by the survey questions may also be multifactorial inheritance disorders that may be caused by a combination of environmental factors and genes. Examples of multifactorial inheritance disorders may include heart disease, Alzheimer's disease, diabetes, cancer, and obesity. The computing server 130 may obtain data on a user's disease-related phenotypes from survey questions about the health history of the user and her family and also from health records uploaded by the user.

Survey questions also may be related to other types of phenotypes such as appearance traits of the users. A survey regarding appearance traits and characteristics may include questions related to eye color, iris pattern, freckles, chin types, finger length, dimple chin, earlobe types, hair color, hair curl, skin pigmentation, susceptibility to skin burn, bitter taste, male baldness, baldness pattern, presence of unibrow, presence of wisdom teeth, height, and weight. A survey regarding other traits also may include questions related to users' taste and smell such as the ability to taste bitterness, asparagus smell, cilantro aversion, etc. A survey regarding traits may further include questions related to users' body conditions such as lactose tolerance, caffeine consumption, malaria resistance, norovirus resistance, muscle performance, alcohol flush, etc. Other survey questions regarding a person's physiological or psychological traits may include vitamin traits and sensory traits such as the ability to sense an asparagus metabolite. Traits may also be collected from historical records, electronic health records and electronic medical records.

The computing server 130 also may present various survey questions related to the environmental factors of users. In this context, an environmental factor may be a factor that is not directly connected to the genetics of the users. Environmental factors may include users' preferences, habits, and lifestyles. For example, a survey regarding users' preferences may include questions related to things and activities that users like or dislike, such as types of music a user enjoys, dancing preference, party-going preference, certain sports that a user plays, video game preferences, etc. Other questions may be related to the users' diet preferences such as like or dislike a certain type of food (e.g., ice cream, egg). A survey related to habits and lifestyle may include questions regarding smoking habits, alcohol consumption and frequency, daily exercise duration, sleeping habits (e.g., morning person versus night person), sleeping cycles and problems, hobbies, and travel preferences. Additional environmental factors may include diet amount (calories, macronutrients), physical fitness abilities (e.g., stretching, flexibility, heart rate recovery), family type (adopted family or not, has siblings or not, lived with extended family during childhood), property and item ownership (has home or rents, has a smartphone or doesn't, has a car or doesn't).

Surveys also may be related to other environmental factors such as geographical, social-economic, or cultural factors. Geographical questions may include questions related to the birth location, family migration history, town, or city of users' current or past residence. Social-economic questions may be related to users' education level, income, occupations, self-identified demographic groups, etc. Questions related to culture may concern users' native language, language spoken at home, customs, dietary practices, etc. Other questions related to users' cultural and behavioral questions are also possible.

For any survey questions asked, the computing server 130 may also ask an individual the same or similar questions regarding the traits and environmental factors of the ancestors, family members, other relatives or friends of the individual. For example, a user may be asked about the native language of the user and the native languages of the user's parents and grandparents. A user may also be asked about the health history of his or her family members.

In addition to storing the survey data in the individual profile store 210, the computing server 130 may store some responses that correspond to data related to genealogical and genetics respectively to genealogy data store 200 and genetic data store 205.

The user profile data, photos of users, survey response data, the genetic data, and the genealogy data may be subject to the privacy and authorization setting of the users to specify any data related to the users that can be accessed, stored, obtained, or otherwise used. For example, when presented with a survey question, a user may select to answer or skip the question. The computing server 130 may present users from time to time information regarding users' selection of the extent of information and data shared. The computing server 130 also may maintain and enforce one or more privacy settings for users in connection with the access of the user profile data, photos, genetic data, and other sensitive data. For example, the user may pre-authorize the access to the data and may change the setting as wished. The privacy settings also may allow a user to specify (e.g., by opting out, by not opting in) whether the computing server 130 may receive, collect, log, or store particular data associated with the user for any purpose. A user may restrict her data at various levels. For example, on one level, the data may not be accessed by the computing server 130 for purposes other than displaying the data in the user's own profile. On another level, the user may authorize anonymization of her data and participate in studies and research conducted by the computing server 130 such as a large-scale genetic study. On yet another level, the user may turn some portions of her genealogy data public to allow the user to be discovered by other users (e.g., potential relatives) and be connected to one or more family trees. Access or sharing of any information or data in the computing server 130 may also be subject to one or more similar privacy policies. A user's data and content objects in the computing server 130 may also be associated with different levels of restriction. The computing server 130 may also provide various notification features to inform and remind users of their privacy and access settings. For example, when privacy settings for a data entry allow a particular user or other entities to access the data, the data may be described as being "visible," "public," or other suitable labels, contrary to a "private" label.

In some cases, the computing server 130 may have a heightened privacy protection on certain types of data and data related to certain vulnerable groups. In some cases, the heightened privacy settings may strictly prohibit the use, analysis, and sharing of data related to a certain vulnerable group. In other cases, the heightened privacy settings may specify that data subject to those settings require prior approval for access, publication, or other use. In some cases, the computing server 130 may provide the heightened privacy as a default setting for certain types of data, such as genetic data or any data that the user marks as sensitive. The user may opt in to sharing of those data or change the default privacy settings. In other cases, the heightened privacy settings may apply across the board for all data of certain groups of users. For example, if computing server 130 determines that the user is a minor or has recognized that a picture of a minor is uploaded, the computing server 130 may designate all profile data associated with the minor as sensitive. In those cases, the computing server 130 may have one or more extra steps in seeking and confirming any sharing or use of the sensitive data.

In some embodiments, the individual profile store 210 may be a large-scale data store. In some embodiments, the individual profile store 210 may include at least 10,000 data records in the form of user profiles and each user profile may be associated with one or more genetic datasets and one or more genealogical data entries. In some embodiments, the individual profile store 210 may include at least 50,000 data records in the form of user profiles and each user profile may be associated with one or more genetic datasets and one or more genealogical data entries. In some embodiments, the individual profile store 210 may include at least 100,000 data records in the form of user profiles and each user profile may be associated with one or more genetic datasets and one or more genealogical data entries. In some embodiments, the individual profile store 210 may include at least 550,000 data records in the form of user profiles and each user profile may be associated with one or more genetic datasets and one or more genealogical data entries. In some embodiments, the individual profile store 210 may include at least 1,000,000 data records in the form of user profiles and each user profile may be associated with one or more genetic datasets and one or more genealogical data entries. In some embodiments, the individual profile store 210 may include at least 2,000,000 data records in the form of user profiles and each user profile may be associated with one or more genetic datasets and one or more genealogical data entries. In some embodiments, the individual profile store 210 may include at least 5,000,000 data records in the form of user profiles and each user profile may be associated with one or more genetic datasets and one or more genealogical data entries. In some embodiments, the individual profile store 210 may include at least 10,000,000 data records in the form of user profiles and each user profile may be associated with one or more genetic datasets and one or more genealogical data entries.

The sample pre-processing engine 215 receives and pre-processes data received from various sources to change the data into a format used by the computing server 130. For genealogy data, the sample pre-processing engine 215 may receive data from an individual via the user interface 115 of the client device 110. To collect the user data (e.g., genealogical and survey data), the computing server 130 may cause an interactive user interface on the client device 110 to display interface elements in which users can provide genealogy data and survey data. Additional data may be obtained from scans of public records. The data may be manually provided or automatically extracted via, for example, optical character recognition (OCR) performed on census records, town or government records, or any other item of printed or online material. Some records may be obtained by digitalizing written records such as older census records, birth certificates, death certificates, etc.

The sample pre-processing engine 215 may also receive raw data from genetic data extraction service server 125. The genetic data extraction service server 125 may perform laboratory analysis of biological samples of users and generate sequencing results in the form of digital data. The sample pre-processing engine 215 may receive the raw genetic datasets from the genetic data extraction service server 125. Most of the mutations that are passed down to descendants are related to single-nucleotide polymorphism (SNP). SNP is a substitution of a single nucleotide that occurs at a specific position in the genome. The sample pre-processing engine 215 may convert the raw base pair sequence into a sequence of genotypes of target SNP sites. Alternatively, the pre-processing of this conversion may be performed by the genetic data extraction service server 125. The sample pre-processing engine 215 identifies autosomal SNPs in an individual's genetic dataset. In some embodiments, the SNPs may be autosomal SNPs. In some embodiments, 700,000 SNPs may be identified in an individual's data and may be stored in genetic data store 205. Alternatively, in some embodiments, a genetic dataset may include at least 10,000 SNP sites. In another embodiment, a genetic dataset may include at least 100,000 SNP sites. In yet another embodiment, a genetic dataset may include at least 300,000 SNP sites. In yet another embodiment, a genetic dataset may include at least 1,000,000 SNP sites. The sample pre-processing engine 215 may also convert the nucleotides into bits. The identified SNPs, in bits or in other suitable formats, may be provided to the phasing engine 220 which phases the individual's diploid genotypes to generate a pair of haplotypes for each user.

The phasing engine 220 phases diploid genetic dataset into a pair of haploid genetic datasets and may perform imputation of SNP values at certain sites whose alleles are missing. An individual's haplotype may refer to a collection of alleles (e.g., a sequence of alleles) that are inherited from a parent.

Phasing may include a process of determining the assignment of alleles (particularly heterozygous alleles) to chromosomes. Owing to sequencing conditions and other constraints, a sequencing result often includes data regarding a pair of alleles at a given SNP locus of a pair of chromosomes but may not be able to distinguish which allele belongs to which specific chromosome. The phasing engine 220 uses a genotype phasing algorithm to assign one allele to a first chromosome and another allele to another chromosome. The genotype phasing algorithm may be developed based on an assumption of linkage disequilibrium (LD), which states that haplotype in the form of a sequence of alleles tends to cluster together. The phasing engine 220 is configured to generate phased sequences that are also commonly observed in many other samples. Put differently, haplotype sequences of different individuals tend to cluster together. A haplotype-cluster model may be generated to determine the probability distribution of a haplotype that includes a sequence of alleles. The haplotype-cluster model may be trained based on labeled data that includes known phased haplotypes from a trio (parents and a child). A trio is used as a training sample because the correct phasing of the child is almost certain by comparing the child's genotypes to the parent's genetic datasets. The haplotype-cluster model may be generated iteratively along with the phasing process with a large number of unphased genotype datasets. The haplotype-cluster model may also be used to impute one or more missing data.

By way of example, the phasing engine 220 may use a directed acyclic graph model such as a hidden Markov model (HMM) to perform the phasing of a target genotype dataset. The directed acyclic graph may include multiple levels, each level having multiple nodes representing different possibilities of haplotype clusters. An emission probability of a node, which may represent the probability of having a particular haplotype cluster given an observation of the genotypes may be determined based on the probability distribution of the haplotype-cluster model. A transition probability from one node to another may be initially assigned to a non-zero value and be adjusted as the directed acyclic graph model and the haplotype-cluster model are trained. Various paths are possible in traversing different levels of the directed acyclic graph model. The phasing engine 220 determines a statistically likely path, such as the most probable path or a probable path that is at least more likely than 95% of other possible paths, based on the transition probabilities and the emission probabilities. A suitable dynamic programming algorithm such as the Viterbi algorithm may be used to determine the path. The determined path may represent the phasing result. U.S. Pat. No. 10,679,729, entitled "Haplotype Phasing Models," granted on Jun. 9, 2020, describes example embodiments of haplotype phasing.

A phasing algorithm may also generate phasing result that has a long-distance accuracy in terms of haplotype separation. For example, in some embodiments, a jig phasing algorithm may be used, which is described in further detail in U.S. Patent Application Publication No. US 2021/0034647, entitled "Clustering of Matched Segments to Determine Linkage of Dataset in a Database," published on Feb. 4, 2021. For example, the computing server 130 may receive a target individual genotype dataset and a plurality of additional individual genotype datasets that include haplotypes of additional individuals. For example, the additional individuals may be reference panels or individuals who are linked (e.g., in a family tree) to the target individual. The computing server 130 may generate a plurality of sub-cluster pairs of first parental groups and second parental groups. Each sub-cluster pair may be in a window. The window may correspond to a genomic segment and has a similar concept of window used in the ethnicity estimation engine 245 and the rest of the disclosure related to HMMs, but how windows are precisely divided and defined may be the same or different in the phasing engine 220 and in an HMM. Each sub-cluster pair may correspond to a genetic locus. In some embodiments, each sub-cluster pair may have a first parental group that includes a first set of matched haplotype segments selected from the plurality of additional individual datasets and a second parental group that includes a second set of matched haplotype segments selected from the plurality of additional individual datasets. The computing server 130 may generate a super-cluster of a parental side by linking the first parental groups and the second parental groups across a plurality of genetic loci (across a plurality of sub-cluster pairs). Generating the super-cluster of the parental side may include generating a candidate parental side assignment of parental groups across a set of sub-cluster pairs that represent a set of genetic loci in the plurality of genetic loci. The computing server 130 may determine a number of common additional individual genotype datasets that are classified in the candidate parental side assignment. The computing server 130 may determine the candidate parental side assignment to be part of the super-cluster based on the number of common additional individual genotype datasets. Any suitable algorithms may be used to generate the super-cluster, such as a heuristic scoring approach, a bipartite graph approach, or another suitable approach. The computing server 130 may generate a haplotype phasing of the target individual from the super-cluster of the parental side.

The IBD estimation engine 225 estimates the amount of shared genetic segments between a pair of individuals based on phased genotype data (e.g., haplotype datasets) that are stored in the genetic data store 205. IBD segments may be segments identified in a pair of individuals that are putatively determined to be inherited from a common ancestor. The IBD estimation engine 225 retrieves a pair of haplotype datasets for each individual. The IBD estimation engine 225 may divide each haplotype dataset sequence into a plurality of windows. Each window may include a fixed number of SNP sites (e.g., about 100 SNP sites). The IBD estimation engine 225 identifies one or more seed windows in which the alleles at all SNP sites in at least one of the phased haplotypes between two individuals are identical. The IBD estimation engine 225 may expand the match from the seed windows to nearby windows until the matched windows reach the end of a chromosome or until a homozygous mismatch is found, which indicates the mismatch is not attributable to potential errors in phasing or imputation. The IBD estimation engine 225 determines the total length of matched segments, which may also be referred to as IBD segments. The length may be measured in the genetic distance in the unit of centimorgans (cM). A unit of centimorgan may be a genetic length. For example, two genomic positions that are one cM apart may have a 1% chance during each meiosis of experiencing a recombination event between the two positions. The computing server 130 may save data regarding individual pairs who share a length of IBD segments exceeding a predetermined threshold (e.g., 6 cM), in a suitable data store such as in the genealogy data store 200. U.S. Pat. No. 10,114,922, entitled "Identifying Ancestral Relationships Using a Continuous stream of Input," granted on Oct. 30, 2018, and U.S. Pat. No. 10,720,229, entitled "Reducing Error in Predicted Genetic Relationships," granted on Jul. 21, 2020, describe example embodiments of IBD estimation.

Typically, individuals who are closely related share a relatively large number of IBD segments, and the IBD segments tend to have longer lengths (individually or in aggregate across one or more chromosomes). In contrast, individuals who are more distantly related share relatively fewer IBD segments, and these segments tend to be shorter (individually or in aggregate across one or more chromosomes). For example, while close family members often share upwards of 71 cM of IBD (e.g., third cousins), more distantly related individuals may share less than 12 cM of IBD. The extent of relatedness in terms of IBD segments between two individuals may be referred to as IBD affinity. For example, the IBD affinity may be measured in terms of the length of IBD segments shared between two individuals.

Community assignment engine 230 assigns individuals to one or more genetic communities based on the genetic data of the individuals. A genetic community may correspond to an ethnic origin or a group of people descended from a common ancestor. The granularity of genetic community classification may vary depending on embodiments and methods used to assign communities. For example, in some embodiments, the communities may be African, Asian, European, etc. In another embodiment, the European community may be divided into Irish, German, Swedes, etc. In yet another embodiment, the Irish may be further divided into Irish in Ireland, Irish immigrated to America in 1800, Irish immigrated to America in 1900, etc. The community classification may also depend on whether a population is admixed or unadmixed. For an admixed population, the classification may further be divided based on different ethnic origins in a geographical region.

Community assignment engine 230 may assign individuals to one or more genetic communities based on their genetic datasets using machine learning models trained by unsupervised learning or supervised learning. In an unsupervised approach, the community assignment engine 230 may generate data representing a partially connected undirected graph. In this approach, the community assignment engine 230 represents individuals as nodes. Some nodes are connected by edges whose weights are based on IBD affinity between two individuals represented by the nodes. For example, if the total length of two individuals' shared IBD segments does not exceed a predetermined threshold, the nodes are not connected. The edges connecting two nodes are associated with weights that are measured based on the IBD affinities. The undirected graph may be referred to as an IBD network. The community assignment engine 230 uses clustering techniques such as modularity measurement (e.g., the Louvain method) to classify nodes into different clusters in the IBD network. Each cluster may represent a community. The community assignment engine 230 may also determine sub-clusters, which represent sub-communities. The computing server 130 saves the data representing the IBD network and clusters in the IBD network data store 235. U.S. Pat. No. 10,223,498, entitled "Discovering Population Structure from Patterns of Identity-By-Descent," granted on Mar. 5, 2019, describes example embodiments of community detection and assignment.

The community assignment engine 230 may also assign communities using supervised techniques. For example, genetic datasets of known genetic communities (e.g., individuals with confirmed ethnic origins) may be used as training sets that have labels of the genetic communities. Supervised machine learning classifiers, such as logistic regressions, support vector machines, random forest classifiers, and neural networks may be trained using the training set with labels. A trained classifier may distinguish binary or multiple classes. For example, a binary classifier may be trained for each community of interest to determine whether a target individual's genetic dataset belongs or does not belong to the community of interest. A multi-class classifier such as a neural network may also be trained to determine whether the target individual's genetic dataset most likely belongs to one of several possible genetic communities.

Reference panel sample store 240 stores reference panel samples for different genetic communities. A reference panel sample is a genetic data of an individual whose genetic data is the most representative of a genetic community. The genetic data of individuals with the typical alleles of a genetic community may serve as reference panel samples. For example, some alleles of genes may be over-represented (e.g., being highly common) in a genetic community. Some genetic datasets include alleles that are commonly present among members of the community. Reference panel samples may be used to train various machine learning models in classifying whether a target genetic dataset belongs to a community, determining the ethnic composition of an individual, and determining the accuracy of any genetic data analysis, such as by computing a posterior probability of a classification result from a classifier.

A reference panel sample may be identified in different ways. In some embodiments, an unsupervised approach in community detection may apply the clustering algorithm recursively for each identified cluster until the sub-clusters contain a number of nodes that are smaller than a threshold (e.g., contains fewer than 1000 nodes). For example, the community assignment engine 230 may construct a full IBD network that includes a set of individuals represented by nodes and generate communities using clustering techniques. The community assignment engine 230 may randomly sample a subset of nodes to generate a sampled IBD network. The community assignment engine 230 may recursively apply clustering techniques to generate communities in the sampled IBD network. The sampling and clustering may be repeated for different randomly generated sampled IBD networks for various runs. Nodes that are consistently assigned to the same genetic community when sampled in various runs may be classified as a reference panel sample. The community assignment engine 230 may measure the consistency in terms of a predetermined threshold. For example, if a node is classified to the same community 95% (or another suitable threshold) of the times whenever the node is sampled, the genetic dataset corresponding to the individual represented by the node may be regarded as a reference panel sample. Additionally, or alternatively, the community assignment engine 230 may select N most consistently assigned nodes as a reference panel for the community.

Other ways to generate reference panel samples are also possible. For example, the computing server 130 may collect a set of samples and gradually filter and refine the samples until high-quality reference panel samples are selected. For example, a candidate reference panel sample may be selected from an individual whose recent ancestors are born at a certain birthplace. The computing server 130 may also draw sequence data from the Human Genome Diversity Project (HGDP). Various candidates may be manually screened based on their family trees, relatives' birth location, and other quality control. Principal component analysis may be used to create clusters of genetic data of the candidates. Each cluster may represent an ethnicity. The predictions of the ethnicity of those candidates may be compared to the ethnicity information provided by the candidates to perform further screening.

The ethnicity estimation engine 245 estimates the ethnicity composition of a genetic dataset of a target individual. The genetic datasets used by the ethnicity estimation engine 245 may be genotype datasets or haplotype datasets. For example, the ethnicity estimation engine 245 estimates the ancestral origins (e.g., ethnicity) based on the individual's genotypes or haplotypes at the SNP sites. To take a simple example of three ancestral populations corresponding to African, European and Native American, an admixed user may have nonzero estimated ethnicity proportions for all three ancestral populations, with an estimate such as [0.05, 0.65, 0.30], indicating that the user's genome is 5% attributable to African ancestry, 65% attributable to European ancestry and 30% attributable to Native American ancestry. The ethnicity estimation engine 245 generates the ethnic composition estimate and stores the estimated ethnicities in a data store of computing server 130 with a pointer in association with a particular user.

In some embodiments, the ethnicity estimation engine 245 divides a target genetic dataset into a plurality of windows (e.g., about 1000 windows). Each window includes a small number of SNPs (e.g., 300 SNPs). The ethnicity estimation engine 245 may use a directed acyclic graph model to determine the ethnic composition of the target genetic dataset. The directed acyclic graph may represent a trellis of an inter-window hidden Markov model (HMM). The graph includes a sequence of a plurality of node groups. Each node group, representing a window, includes a plurality of nodes. The nodes represent different possibilities of labels of genetic communities (e.g., ethnicities) for the window. A node may be labeled with one or more ethnic labels. For example, a level includes a first node with a first label representing the likelihood that the window of SNP sites belongs to a first ethnicity and a second node with a second label representing the likelihood that the window of SNPs belongs to a second ethnicity. Each level includes multiple nodes so that there are many possible paths to traverse the directed acyclic graph.

The nodes and edges in the directed acyclic graph may be associated with different emission probabilities and transition probabilities. An emission probability associated with a node represents the likelihood that the window belongs to the ethnicity labeling the node given the observation of SNPs in the window. The ethnicity estimation engine 245 determines the emission probabilities by comparing SNPs in the window corresponding to the target genetic dataset to corresponding SNPs in the windows in various reference panel samples of different genetic communities stored in the reference panel sample store 240. The transition probability between two nodes represents the likelihood of transition from one node to another across two levels. The ethnicity estimation engine 245 determines a statistically likely path, such as the most probable path or a probable path that is at least more likely than 95% of other possible paths, based on the transition probabilities and the emission probabilities. A suitable dynamic programming algorithm such as the Viterbi algorithm or the forward-backward algorithm may be used to determine the path. After the path is determined, the ethnicity estimation engine 245 determines the ethnic composition of the target genetic dataset by determining the label compositions of the nodes that are included in the determined path. U.S. Pat. No. 10,558,930, entitled "Local Genetic Ethnicity Determination System," granted on Feb. 11, 2020 and U.S. Pat. No. 10,692,587, granted on Jun. 23, 2020, entitled "Global Ancestry Determination System" describe different example embodiments of ethnicity estimation.

The front-end interface 250 displays various results determined by the computing server 130. The results and data may include the IBD affinity between a user and another individual, the community assignment of the user, the ethnicity estimation of the user, phenotype prediction and evaluation, genealogy data search, family tree and pedigree, relative profile and other information. The front-end interface 250 may allow users to manage their profile and data trees (e.g., family trees). The users may view various public family trees stored in the computing server 130 and search for individuals and their genealogy data via the front-end interface 250. The computing server 130 may suggest or allow the user to manually review and select potentially related individuals (e.g., relatives, ancestors, close family members) to add to the user's data tree. The front-end interface 250 may be a graphical user interface (GUI) that displays various information and graphical elements. The front-end interface 250 may take different forms. In one case, the front-end interface 250 may be a software application that can be displayed on an electronic device such as a computer or a smartphone. The software application may be developed by the entity controlling the computing server 130 and be downloaded and installed on the client device 110. In another case, the front-end interface 250 may take the form of a webpage interface of the computing server 130 that allows users to access their family tree and genetic analysis results through web browsers. In yet another case, the front-end interface 250 may provide an application program interface (API).

The tree management engine 260 performs computations and other processes related to users' management of their data trees such as family trees. The tree management engine 260 may allow a user to build a data tree from scratch or to link the user to existing data trees. In some embodiments, the tree management engine 260 may suggest a connection between a target individual and a family tree that exists in the family tree database by identifying potential family trees for the target individual and identifying one or more most probable positions in a potential family tree. A user (target individual) may wish to identify family trees to which he or she may potentially belong. Linking a user to a family tree or building a family may be performed automatically, manually, or using techniques with a combination of both. In an embodiment of an automatic tree matching, the tree management engine 260 may receive a genetic dataset from the target individual as input and search related individuals that are IBD-related to the target individual. The tree management engine 260 may identify common ancestors. Each common ancestor may be common to the target individual and one of the related individuals. The tree management engine 260 may in turn output potential family trees to which the target individual may belong by retrieving family trees that include a common ancestor and an individual who is IBD-related to the target individual. The tree management engine 260 may further identify one or more probable positions in one of the potential family trees based on information associated with matched genetic data between the target individual and those in the potential family trees through one or more machine learning models or other heuristic algorithms. For example, the tree management engine 260 may try putting the target individual in various possible locations in the family tree and determine the highest probability position(s) based on the genetic dataset of the target individual and genetic datasets available for others in the family tree and based on genealogy data available to the tree management engine 260. The tree management engine 260 may provide one or more family trees from which the target individual may select. For a suggested family tree, the tree management engine 260 may also provide information on how the target individual is related to other individuals in the tree. In a manual tree building, a user may browse through public family trees and public individual entries in the genealogy data store 200 and individual profile store 210 to look for potential relatives that can be added to the user's family tree. The tree management engine 260 may automatically search, rank, and suggest individuals for the user conduct manual reviews as the user makes progress in the front-end interface 250 in building the family tree.

As used herein, "pedigree" and "family tree" may be interchangeable and may refer to a family tree chart or pedigree chart that shows, diagrammatically, family information, such as family history information, including parentage, offspring, spouses, siblings, or otherwise for any suitable number of generations and/or people, and/or data pertaining to persons represented in the chart. U.S. Pat. No. 11,429,615, entitled "Linking Individual Datasets to a Database," granted on Aug. 30, 2022, describes example embodiments of how an individual may be linked to existing family trees.

Example Data Inheritance Determination

Figure 3:
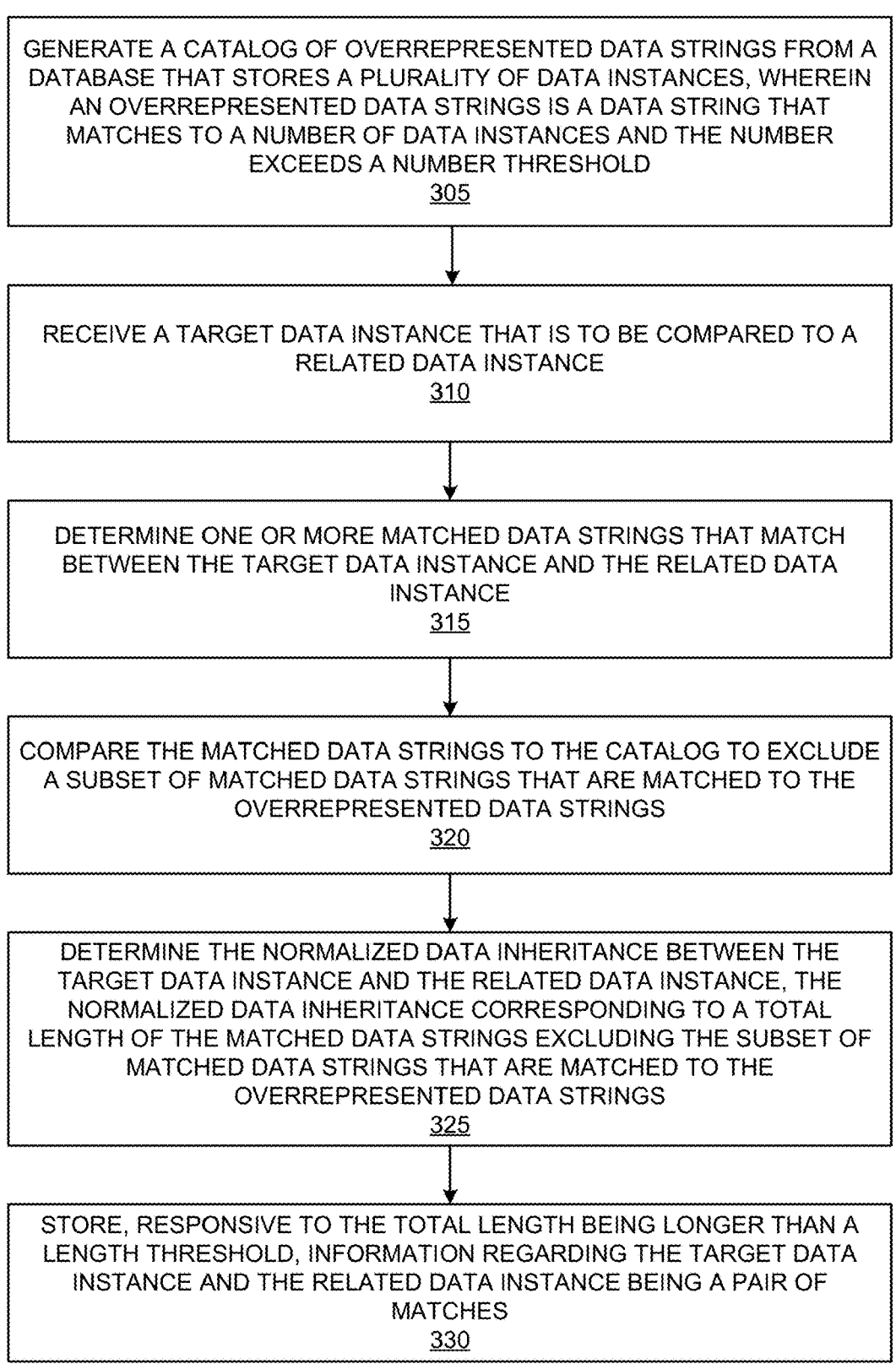
FIG. 3 is a flowchart depicting an example process for determining a normalized data inheritance between two data instances, in accordance with some embodiments.

FIG. 3 is a flowchart depicting an example process 300 for determining a normalized data inheritance between two data instances, in accordance with some embodiments. The process may be performed by one or more engines of the computing server 130 illustrated in FIG. 2. The process 300 may be embodied as a software algorithm that may be stored as computer instructions that are executable by one or more processors. The instructions, when executed by the processors, cause the processors to perform various steps in the process 300. In various embodiments, the process may include additional, fewer, or different steps. While various steps in process 300 may be discussed with the use of computing server 130, each step may be performed by a different computing device.

Data may be inherited and evolved based on real-world events that are not always recorded or documented. Yet, while the real-world events may not be completely documented, the change and inheritance of those events may be traceable through the change among data instances. For example, two data instances may be generated independently and individually reflect the status of two events, the natures, histories, or characteristics of two apparently unrelated named entities, or any combination of natures. However, the two data instances or corresponding events or named entities may be inherited from one or more common sources so that the two data instances share some similarities in the data. As such, the nature of inheritance may be revealed by analyzing and comparing the two data instances.

In some cases, however, there are locations in the data where many data instances all share the same or very similar data bits. Those locations may be overrepresented in a database of data instances and may not carry any significance in determining how two data instances are related. For example, those locations may be common building blocks of data instances or are inherited as a result of a widely common event that does not bear sufficient significance in distinguishing whether two data instances are in fact related or unrelated or elucidate details regarding histories that the data instances represent. Process 300 provides a solution to determine a normalized data inheritance between two data instances that determines the matching of data bits in the two instances while removing (normalizing) commonly matched bits that are too common, and therefore not informative, in other data instances.

In some embodiments, process 300 can include generating a catalog of overrepresented data strings from a database that stores a plurality of data instances (step 305). An overrepresented data string is a data string that matches a number of data instances and the number exceeds a number threshold. A data instance can be any data records, blocks of bits, data sequences such as genetic sequences or genetic data stored in genetic data store 205, any suitable representations of data entries, or any data that are stored in the genealogy data store 200, genetic data store 205, and individual profile store 210.

The computing server 130 may generate a catalog of overrepresented data strings from data instances of a database. The database may be the genealogy data store 200, the genetic data store 205, and/or the individual profile store 210. An overrepresented data string is a data string that exists in a number of data instances in the database and the number exceeds a number threshold, such as the data string that corresponds to the spikes shown in the plots of FIG. 4A. The computing server 130 may store data bits of a large number of data instances. For example, the computing server 130 may store millions of data instances corresponding to many users of the computing server 130. The population of data instances may correspond to the entire set of the relevant data instances stored by the computing server 130.

The computing server 130 may perform a sampling of the data instances. The sampled data instances may correspond to the entire database (e.g., every data instance is sampled) or may correspond to a subset of the database. For example, the computing server 130 may perform statistical sampling to use a subset of data instances to identify overrepresented data strings. In some embodiments, the computing server 130 may sample over 1,000 data instances. In some embodiments, the computing server 130 may sample over 10,000 data instances. In some embodiments, the computing server 130 may sample over 100,000 data instances. In some embodiments, the computing server 130 may sample over 200,000 data instances. In some embodiments, the computing server 130 may sample over 500,000 data instances. In some embodiments, the computing server 130 may sample over 1,000,000 data instances.

In some embodiments, the catalog may include data bit sequences of overrepresented data strings categorized by windows of data locality. In some embodiments, the computing server 130 may divide the data into data blocks that may be referred to as windows of data locality or simply windows. In some embodiments, the data instances stored in the computing server 130 may be formalized to a particular data format, such as in the form of data bits or any suitable format. The entirety of the data instance may be divided into a plurality of windows (e.g., data blocks). Each window includes a set of data bits (e.g., 96 data bits). The overrepresented data strings in the catalog are arranged by the windows of data locality within which the overrepresented data strings are located. For example, if an overrepresented data string is shorter than 96 data bits, it may be located entirely within a single window. If an overrepresented data string is longer than a window, it may be divided into multiple data strings, and those divided sequences are categorized as data strings in a few consecutive windows.

FIG. 5A is a conceptual diagram illustrating an example of the catalog, in accordance with some embodiments. The example catalog 500 shown in FIG. 5A may be a simplified version. Each entry in the catalog may include additional metadata and fields. Also, in various embodiments, the catalog may be saved in different formats. The catalog 500 may save data string sequences that are overrepresented in each window. For example, for window #101, there are 3 data string sequences that are overrepresented. For window #102, there are 2 data string sequences that are overrepresented. In some embodiments, the actual data sequences that may be stored in the catalog. Alternatively or additionally, an encoded version of the data sequence may be stored such as by hashing a data block. For example, the data sequence may be encoded by an encoding scheme so that the data bits are easier to be compared. The total count of sampled data instances that possess a particular overrepresented data string sequence may also be stored in the frequency column.

The computing server 130 may generate the catalog by analyzing a large number of data instances. For example, the computing server 130 may retrieve the data instances from a database. The data instances may be randomly sampled and/or selected from a database. The computing server 130 may divide each data instance into a plurality of windows of data locality. For each window, different data instances may have different data string sequences. For a particular sequence, the computing server 130 may tally, for each window, the data strings that have a particular sequence. The computing server 130 may determine whether a tally of the particular sequence exceeds the number threshold. For example, the computing server 130 may set the threshold to 1,000, 10,000, 100,000, or any suitable number. The number threshold may be chosen relative to overall distribution of data sequence repetitiveness. For example, typically many of the sequences are only present in a certain number of data instances while a small groups of sequences are present in 100 times of the typical number. This may be used to determine the number threshold, as further illustrated in FIG. 4A. If the tally exceeds the threshold, the computing server 130 determines that the data string sequence is overrepresented and saves the sequence in the catalog. For the same window, the computing server 130 moves on to another data string sequence and tally the sequence. The sequences that are possessed by a large number of data instances may be saved in the catalog. The computing server 130 may repeat this tally for every window to build the catalog.

In some embodiments, in determining whether a data string is overrepresented so that the data string should be included in the catalog, the computing server 130 may provide one or more relaxed conditions in matching the data bits. For example, the computing server 130 may allow one or more changes in bits without classifying two data sequences as being different to account for potential data errors. In some embodiments, the data instances may be in the form of a pair of sequences. The computing server 130 may allow a mismatch on one sequence as long as the other sequence is matched. In some embodiments, the computing server 130 may even tolerate a mismatch in both sequences for a threshold number of times. In some embodiments, the data instances may be genetic datasets. The computing server 130 may regard the sequences window in two data instances as matched unless a homozygous mismatch is identified.

Different catalogs may be built using different selection sets of criteria. For example, the selection criteria may include a threshold number of exact matches, a threshold number of relaxed matches, a data locality window size, and other thresholds and criteria.

The catalog may be a predetermined catalog and is stored in a database. In such a case, when the computing server 130 begins to analyze the data instance of a target named entity, the overrepresented data strings do not need to be identified on the fly. The computing server 130 may simply retrieve the sequence data from the catalog. As such, the computation speed for the process 300 can be improved.

Continuing with reference to FIG. 3, in some embodiments, process 300 can include receiving a target data instance that is to be compared to a related data instance (step 310). The computing server 130 may receive a data instance. In some cases, the data instance is related to a target named entity such as a target user. The target named entity may be a user of the computing server 130 who has taken a DNA test, such as through the genetic data extraction service server 125. In such a case, the data instance may be the genetic dataset of the target user stored in the genetic data store 205. The data instance may be raw, processed, or phased. The related data instance may be a candidate to be compared to the target data instance. Before the comparison, the computing server 130 may not know whether the related data instance is actually related to the target data instance or not. In some embodiments, the computing server 130 may intend to identify multiple data instances that are actually related to the target data instance. In such a case, the computing server 130 may compare the target data instance to other data instances in the database one by one. The computing server 130 may repeat the process 300 for each comparison.

Continuing with reference to FIG. 3, in some embodiments, process 300 can include determining one or more matched data strings that match between the target data instance and the related data instance (step 315). The computing server 130 may determine one or more matched data strings in the target data instance that is shared with a related data instance. The matching may be based on different criteria in various embodiments. In some embodiments, the computing server 130 may apply an exact match standard. In some embodiments, the computing server 130 may apply a fuzzy match standard. In some embodiments, the computing server 130 may tolerate a small degree of mismatch until the mismatch reaches a threshold extent. In some embodiments, the identification of matched data strings applies the same standard as the identification of over-represented data strings. For example, the computing server 130 may allow one or more changes in bits without classifying two data sequences as being different to account for potential data errors. In some embodiments, the data instances may be in the form of a pair of sequences. The computing server 130 may allow a mismatch on one sequence as long as the other sequence is matched. In some embodiments, the computing server 130 may even tolerate a mismatch in both sequences for a threshold number of times. In some embodiments, the data instances may be genetic datasets. The computing server 130 may regard the sequences window in two data instances as matched unless a homozygous mismatch is identified. Any matching that is not an exact match may be referred to as a weak match.

Continuing with reference to FIG. 3, in some embodiments, process 300 can include comparing the matched data strings to the catalog to exclude a subset of matched data strings that are matched to the overrepresented data strings (step 320). In determining the matched data strings, the computing server 130 may exclude the overrepresented data strings. To determine the matched data strings, the computing server 130 may phase the target data instance into a pair of data string datasets. The computing server 130 may then compare the pair of data string datasets with data string datasets of the related data instance. The computing server 130 may use one or more different ways to exclude the overrepresented data strings. For example, in some embodiments, the computing server 130 compares the target data instances to the related data instance to generate candidate matched data strings. The computing server 130 retrieves the overrepresented data strings from the catalog. In turn, the computing server 130 removes the candidate matched data strings that are the overrepresented data strings. In some embodiments, the computing server 130 divides the target data instance into a plurality of windows of data locality. The computing server 130 receives, from the catalog, a subset of the windows that include the overrepresented data strings. The computing server 130 may then compare the data instances of the target named entity and the related data instance in the windows that are not under the subset.

Continuing with reference to FIG. 3, in some embodiments, process 300 can include determining the normalized data inheritance between the target data instance and the related data instance, the normalized data inheritance corresponding to the total length of the matched data strings excluding the subset of matched data strings that are matched to the overrepresented data strings (step 325). The computing server 130 may determine the total length of the matched data strings excluding the overrepresented data strings. The determination of the total length may be performed by measuring the length of the matched data strings or another metric that measures the size of the data strings. In some embodiments, the computing server 130 may exclude the overrepresented data strings in calculating the total length. In some embodiments, the excluded overrepresented data strings may be used for other analyses. For example, in some cases, the overrepresented data strings may be common in a specific group of data instances, a real-world event, or a named entity that is commonly associated with multiple data instances. The computing server 130 may run other downstream analyses to discover characteristics or natures that are common to the data instances that possess the overrepresented data strings.

Continuing with reference to FIG. 3, in some embodiments, process 300 can include storing, responsive to the total length being longer than a length threshold, information regarding the target data instance and the related data instance being a pair of matches (step 330). For example, the length threshold may be selected based on the overall distribution of lengths of matched sequences. The computing server 130 may output, responsive to the total length longer than a length threshold, information regarding the matched data strings. For example, the information regarding the matched data strings may include the total length and an indication that the target data instance and related data instance share an inheritance based on some kinds of real-world events.

Example IBD Haplotype Filtering Processes

Figure 4A:
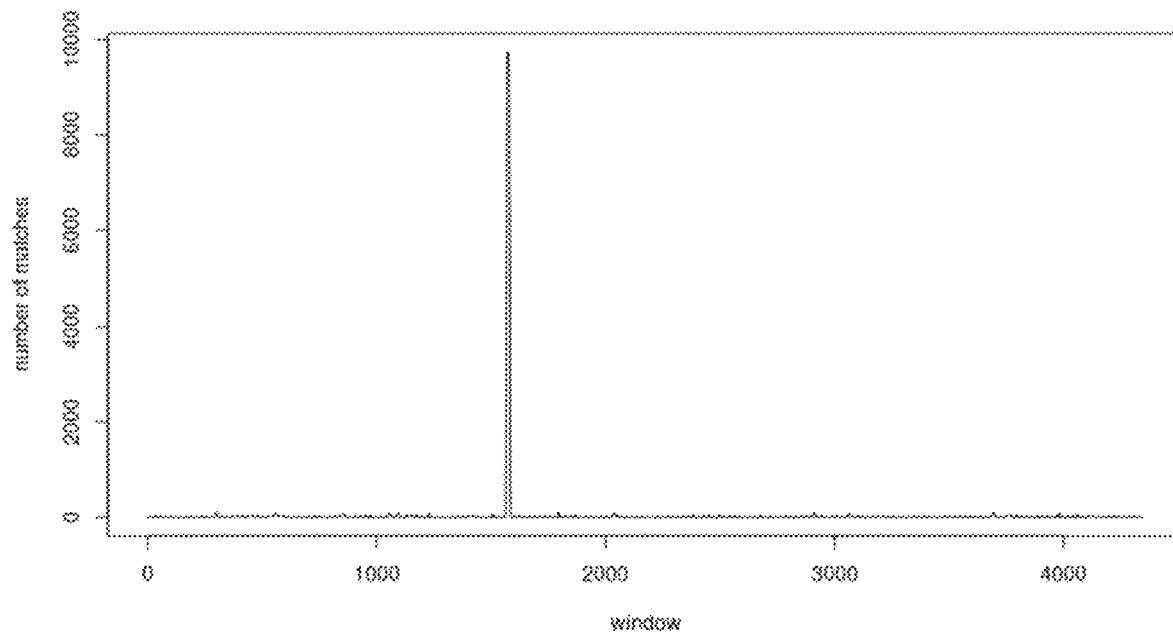
FIG. 4A includes two example plots that illustrate a technical challenge in identifying shared IBD segments between two individuals, in accordance with some embodiments.
Figure 4A:
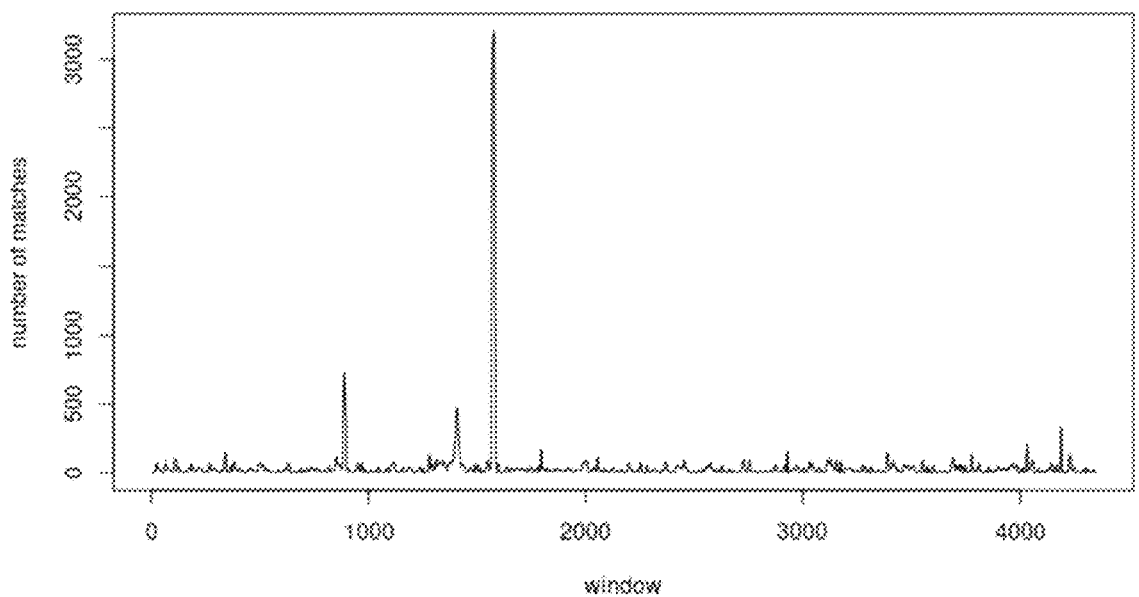
Figure 4B:
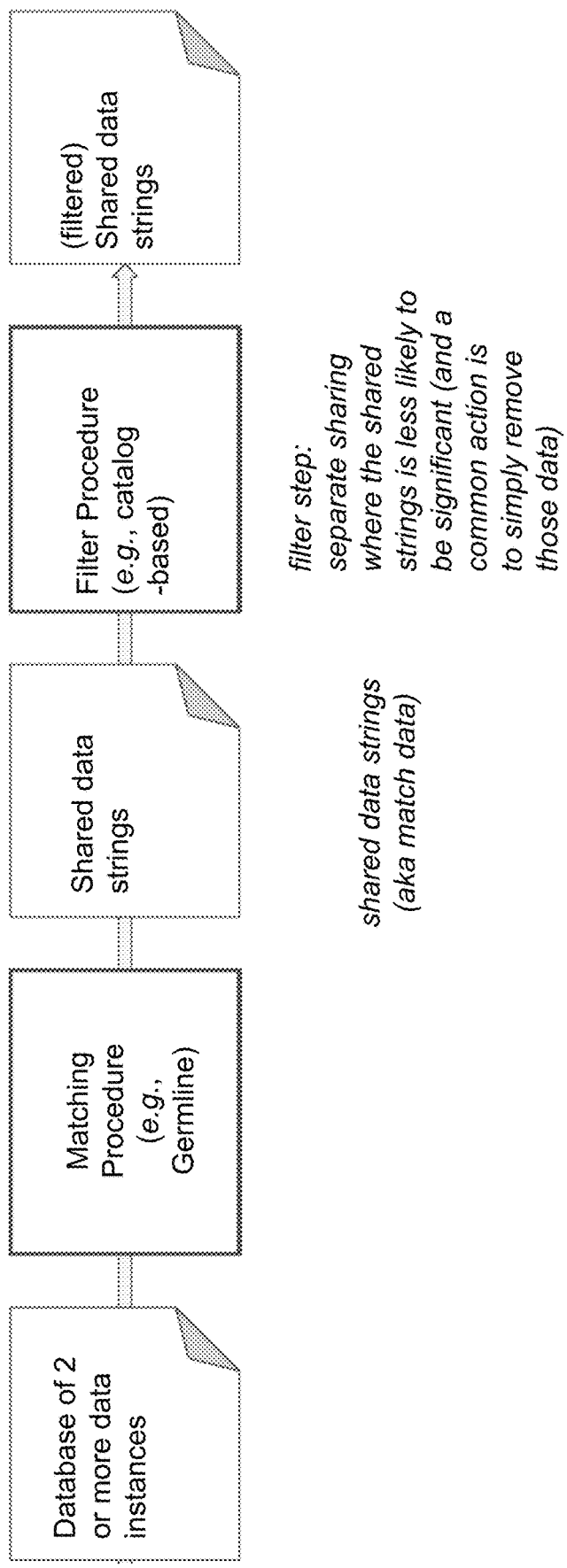
FIG. 4B is a flowchart that summarizes an example pipeline for generating an IBD estimate between two individuals, in accordance with some embodiments.

FIG. 4A includes two example plots that illustrate a technical challenge in identifying shared IBD segments between two individuals, in accordance with some embodiments. In identifying shared IBD segments between two individuals, the computing server 130 may use the phasing engine 220 and the IBD estimation engine 225 to generate a number of segments in the two individuals' genetic data that are matching. The computing server 130 may filter the identified shared IBD segments to remove segments that are commonly present in many individuals before the computing server 130 determines whether the two individuals are IBD related. FIG. 4B is a flowchart that summarizes an example pipeline for generating an IBD estimate between two individuals.

FIG. 4A illustrates the reason why the filtering step is carried out. FIG. 4A includes two plots that show the windows of genomic locality on the x-axis and the number of matched individuals on the y-axis for two target individuals. For each target individual, the genetic data of the target individual is compared to the genetic data of a large number of sampled individuals in the genetic data store 205. The genetic data is divided into multiple windows of the genomic locality. For example, each window may include 96 SNPs, though the disclosure is not limited thereto. Windows of uniform length may be utilized, or windows of varying length, for example depending on a location in the genome, may likewise be utilized as suitable and are contemplated herein. For each window, the computing server 130 tallies the number of sampled individuals that have shared IBD segments with the target individual.

As shown in the plots for both individuals, there are certain ranges of windows that have an unusually large number of matches. This means that a large number of people, whether they are related or not, possess the same or similar segments in those windows. If those segments corresponding to the abnormally high peaks in the plots—which create substantial noise—are not filtered, the computing server 130 may report too many false-positive IBD relatives. The processing-resource economies realized from reducing such noise and from paring the number and volume of matching segments to compare between the billions of potential pairings of the potentially millions or tens of millions of individuals in a genomics database using embodiments of the present disclosure are self-evidently advantageous and result in substantial improvements in cost and latency for a genetics and/or genealogy research service.

U.S. Pat. No. 10,720,229, entitled "Reducing Error in Predicted Genetic Relationships," granted on Jul. 21, 2020, describes a conventional way to reduce the errors in report IBD segments. The process described in the Patent may also be referred to as TIMBER. In summary, TIMBER calculates a weight value for each window of genomic locality based on the number of sampled individuals that have the shared segments with the target individual. In calculating the total length of the shared segment for the target individual with a potentially related individual, the weight values for various windows are accounted for to reduce or remove the influence of the windows that many individuals share the same segments.

Figure 4C:
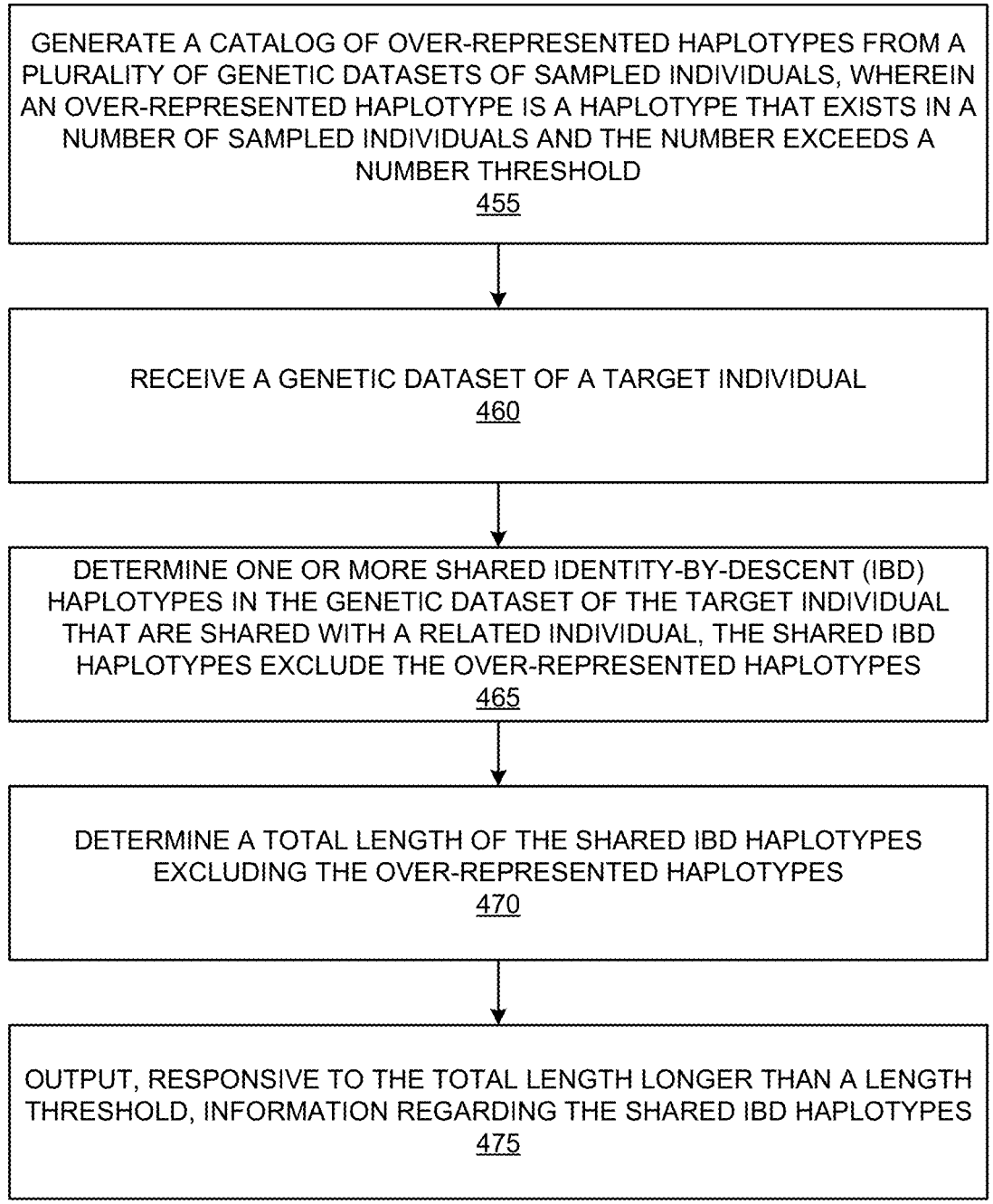
FIG. 4C is a flowchart depicting a novel process to reduce the error of determining shared IBD segments, in accordance with some embodiments.

FIG. 4C is a flowchart depicting a novel process 450 to reduce the error of determining shared IBD segments, in accordance with some embodiments. The process 450 may be used by the computing server 130 to replace TIMBER in IBD estimation used by the IBD estimation engine 225. The process 450 may be performed by a computing device, such as computing server 130. The process 450 may be embodied as a software algorithm that may be stored as computer instructions that are executable by one or more processors. The instructions, when executed by the processors, cause the processors to perform various steps in the process 450.

The process 450 may be an example application of the process 300 in the context of genetic data. For example, the data instances in the process 300 may be genetic datasets stored in the genetic data store 205 for the process 450. The overrepresented data strings in the process 300 may be overrepresented haplotypes in the process 450. The matched data strings may be IBD matched segments in the genetic data. The matching criteria used in the process 450 may be a strict match or a relaxed match that allows heterozygous mismatch. In some embodiments, the computing server 130 may determine a mismatch when a homozygous mismatch is detected.

The computing server 130 may generate 455 a catalog of overrepresented haplotypes from genetic datasets of a population of sampled individuals. An overrepresented haplotype is a haplotype that exists in a number of sampled individuals and the number exceeds a number threshold, such as the haplotype that corresponds to the spikes shown in the plots of FIG. 4A. The computing server 130 may store, such as via the genetic data store 205, genetic data of a large number of individuals. For example, the computing server 130 may store millions of users who have taken DNA tests and authorize the computing server 130 to store the genetic data. The population may correspond to the entire set of genetic data or a subset. The sampled individuals may correspond to the entire database (e.g., every user is sampled) or may correspond to a subset of the database. For example, the computing server 130 may perform statistical sampling to use a subset of genetic datasets to identify overrepresented haplotypes. In some embodiments, the computing server 130 may sample over 1,000 individuals. In some embodiments, the computing server 130 may sample over 10,000 individuals. In some embodiments, the computing server 130 may sample over 100,000 individuals. In some embodiments, the computing server 130 may sample over 200,000 individuals. In some embodiments, the computing server 130 may sample over 550,000 individuals. In some embodiments, the computing server 130 may sample over 1,000,000 individuals.

Different catalogs may be built using different selection sets of criteria. For example, the selection criteria may include a threshold number of exact matches, a threshold number of relaxed matches, a data locality window size, and other thresholds and criteria.

In some embodiments, the catalog may include nucleotide sequences of overrepresented haplotypes categorized by windows of genomic locality. In some embodiments, the computing server 130 may divide the human genome (or part of the entire genome) into sections that may be referred to as windows of genomic locality or simply windows. In some embodiments, the genetic datasets stored in the computing server 130 may be formalized to a particular data format, such as in the form of a sequence of SNPs. The entirety of the genetic dataset may be divided into a plurality of windows. Each window includes a set of SNPs (e.g., 96 SNPs). The overrepresented haplotypes in the catalog are arranged by the windows of the genomic locality within which the overrepresented haplotypes are located. For example, if an overrepresented haplotype is shorter than 96 SNPs, it may be located entirely within a single window. If an overrepresented haplotype is longer than a window, it may be divided into multiple haplotypes and those divided sequences are categorized as haplotypes in a few consecutive windows.

FIG. 5B is a conceptual diagram illustrating an example of the catalog, in accordance with some embodiments. The example catalog 550 shown in FIG. 5B may be a simplified version. Each entry in the catalog may include additional metadata and fields. Also, in various embodiments, the catalog may be saved in different formats. The catalog 550 may save haplotype sequences that are overrepresented in each window. For example, for window #101, there are 3 haplotype sequences that are overrepresented. For window #102, there are 2 haplotype sequences that are overrepresented. The actual nucleotide sequence may be stored in the catalog. Alternatively or additionally, an encoded version of the nucleotide sequence may be stored. For example, the nucleotide sequence may be turned into a binary sequence, such as using two bits to represent a nucleotide. In some cases, each bit of the binary sequence may correspond to a SNP, wherein one value of the bit represents the major allele and the other value of the bit represents the minor allele. The total count of sampled individuals who possess a particular overrepresented haplotype sequence may also be stored in the frequency column.

The computing server 130 may generate the catalog by analyzing a large number of genetic datasets of sampled individuals. For example, the computing server 130 may receive the genetic datasets of the sampled individuals. The genetic datasets may take the form of phased haplotypes or the computing server 130 may phase the genotypes of the sampled individuals. The individuals may be randomly sampled and/or selected from the reference panel sample store 240. The computing server 130 may divide each genetic dataset into a plurality of windows of the genomic locality. For example, the computing server 130 may divide a genetic dataset window by window for every N SNPs such as 96. For each window, different sampled individuals may have different haplotype sequences. For a particular sequence, the computing server 130 may tally, for each window, the phased haplotypes that have the particular sequence. The computing server 130 may determine whether a tally of the particular sequence exceeds the number threshold. For example, the computing server 130 may set the threshold to 1,000, 10,000, 100,000, or any suitable number. If the tally exceeds the threshold, the computing server 130 determines that the haplotype sequence is overrepresented and saves the sequence in the catalog. For the same window, the computing server 130 moves on to another haplotype sequence and tally the sequence. The sequences that are possessed by a large number of sampled individuals may be saved in the catalog. The computing server 130 may repeat this tally for every window to build the catalog.

The catalog may be a predetermined catalog and is stored in a database. In such a case, when the computing server 130 begins to analyze the genetic dataset of a target individual, the overrepresented haplotypes do not need to be determined on the fly. The computing server 130 may simply retrieve the sequence data from the catalog. As such, the computation speed for estimating IBD can be improved, such as compared to TIMBER.

The computing server 130 may receive 450 a genetic dataset of a target individual. The target individual may be a user of the computing server 130 who has taken a DNA test, such as through the genetic data extraction service server 125. The target individual may intend to use the services of the computing server 130 to gain more insight regarding the ethnicity, genetic compositions, and information of his/her relatives. The genetic dataset may be raw, processed, or phased. The discussion of the genetic data extraction service server 125 and the genetic data store 205 provides more examples of the types of the genetic dataset that the computing server 130 may receive. In some embodiments, the genetic dataset of the target individual may be genotype data. In some embodiments, the genetic dataset may be a pair of phased haplotypes, such as the data generated by the phasing engine 220.

The computing server 130 may determine 465 one or more shared IBD segments in the genetic dataset of the target individual that is shared with a related individual. The shared IBD segments may be shared IBD haplotypes. The related individual may be another DNA tester or otherwise someone whose genetic dataset is available to the computing server 130. The computing server 130 may include genetic datasets of many individuals. The computing server 130 may use the IBD estimation engine 225 to identify IBD relatives of the target individual. The computing server 130 may examine the genetic data of the two individuals (the target individual and the related individual) to find shared IBD segments, which may be segments that match the two individuals. In some embodiments, the shared segments do not need to be identical matches. The precise determination of what a shared segment is may vary depending on embodiments. In some embodiments, a shared segment may be defined as a segment that is between two homozygous mismatches in the genome for the target individual and the related individual. For example, on one end of the shared segment, the target individual and the related individual may respectively have "TT" and "AA" (thus making a homozygous mismatch and on the other end of the shared segment, the target individual and the related individual may respectively have "GG" and "AA" (another homozygous mismatch). In some embodiments, the computing server 130 may tolerate one or more heterozygous mismatches within the shared segment. In some embodiments, the computing server 130 may require one or more additional conditions for an individual to be classified as a related individual. For example, in some embodiments, the computing server 130 may determine the total length of the shared IBD segments between the target individual and another individual. The other individual may be classified as a related individual if the individual has at least a threshold total length of shared IBD segments with the target individual.

In determining the shared IBD haplotypes, the computing server 130 may exclude the overrepresented haplotypes. To determine the shared IBD haplotypes, the computing server 130 may phase the genetic dataset of the target individual into a pair of haplotype datasets. The computing server 130 may then compare the pair of haplotype datasets with haplotype datasets of the related individual. The computing server 130 may use one or more different ways to exclude the overrepresented haplotypes. For example, in some embodiments, the computing server 130 compares the genetic datasets of the target individual and the related individual to generate candidate shared IBD haplotypes. The computing server 130 retrieves the overrepresented haplotypes from the catalog. In turn, the computing server 130 removes the candidate shared IBD haplotypes that are the overrepresented haplotypes. In some embodiments, the computing server 130 divides the genetic dataset of the target individual into a plurality of windows of the genomic locality. The computing server 130 receives, from the catalog, a subset of the windows that include the overrepresented haplotypes. The computing server 130 may then compare the genetic datasets of the target individual and the related individual in the windows that are not under the subset.

The computing server 130 may determine 470 a total length of the shared IBD haplotypes excluding the overrepresented haplotypes. The determination of the total length may be performed by measuring the cM of the shared IBD haplotypes. In some embodiments, the computing server 130 may exclude the overrepresented haplotypes in calculating the total length. In some embodiments, the excluded overrepresented haplotypes may be used for other analyses. For example, in some cases, the overrepresented haplotypes may be common in an ethnicity. The computing server 130 may run other downstream analyses to discover characteristics or natures that are common to the individuals who possess the overrepresented haplotypes.

The computing server 130 may store and output 475, responsive to the total length being longer than a length threshold, information regarding the shared IBD haplotypes. For example, the information regarding the shared IBD haplotypes may include the total length and an indication that the target individual and related individual are IBD-related. The length threshold may be any suitable number that indicates certain significant in relatedness, such 4 cM, 8 cM, 12 cM, etc.

Practical Examples and Experimental Results

The table below shows the child/parent match agreement using 8 cM as the threshold. If a genetic dataset is perfectly extracted, the agreement should be 100% because the child inherits the DNA from the parent. However, experimental data shows that the agreement does not achieve 100% because of various potential processing errors that may occur in generating genetic datasets, such as sequencing errors, genotyping errors, imputation errors, etc. The table shows that the process 450 in accordance with some embodiments improves the agreement over TIMBER.

| Scenario | Agreement |
| --- | --- |
| No IBS Filtering | 88.1% |
| TIMBER | 81.5% |
| Process 300 | 85.0% |

The table below shows the filter rates for TIMBER and the process 450. The data shows that the process 300 significantly improves the filter rate (e.g., reducing false positives of IBD matches) for a certain admixed population while maintaining a similar performance for non-admixed populations.

| Population | TIMBER Filter Rate | Process 300 Filter Rate |
| --- | --- | --- |
| Puerto Rico | 0.248 | 0.424 |
| France | 0.541 | 0.547 |
| Spain | 0.475 | 0.472 |

The following is an example procedure using some example numbers, in accordance with some embodiments. The actual numbers used are for example only and are non-limiting. The computing server 130 may consider filtering matches (e.g., Identity by State or IBS matches) based on the presence of a haplotype that has been deemed high frequency in the database instead of using TIMBER.

In some embodiments, the computing server 130 may find commonly-occurring haplotypes and write the commonly-occurring haplotypes down in a catalog. For a target individual genetic dataset and a potential match, the computing server 130 may divide shared centimorgans into two groups. The first group includes the shared haplotypes that can be found in the catalog. The second group includes the shared haplotypes that are not found in the catalog. If there are sufficient shared haplotypes in the second group, the computing server 130 may report that the target individual and the potentially related individual as being a match. The computing server 130 may also store the matched segments and other IBD data in a database for later use.

In an experiment, the computing server 130 chooses an example catalog. A catalog with identifier c50d10f96g0 with 1,438,495 haplotypes, and like TIMBER, tends to filter out roughly ⅔ of matches. This experiment selects this catalog out of many, because the sequence seems to filter matches at about the same rate as TIMBER does.

In this example, each catalog is named after thresholds c, d, f, and g. The example category here is c50d10f96g0. The threshold c50 stands for a person who must match at least 50 other people on this haplotype for it to be included in the catalog. The computing server 130 did a matching that compared a set of 100,000 to a set of 1,000,000, so the haplotype appeared 50 times in a set of 1 M, or a rate of 0.005%, but that means the inferred haplotype was exactly the same 50 times.

The threshold d10 stands for that the exact haplotype had to appear 10 times—at least 10 people have to find the exact same haplotype in 50+ of their matches. The threshold f96 means 96-SNP windows are used and the threshold g0 means cM-based windows are not used.

The haplotypes in the catalog are high-quality because the haplotypes are based on many overlapping matches in the same place.

For each match, the computing server 130 can determine the shared haplotype, but sites where both people are heterozygous are undetermined, there is also the issue of imputation errors. For the experiments using the presence or absence of haplotypes (connections to ethnicity or communities), the computing server may check if a (phased and imputed) genotype is consistent with having the haplotypes (e.g., no homozygous sites that do not match the haplotype allele).

Based on this experiment, several results were observed. On a new data set (e.g., not the one used to choose the catalog), the IBS filter rate remains the same. Using the catalog tends to agree with TIMBER on the filter-match-out versus filter-match-in decision much more than chance. If TIMBER keeps a match, there is a ⅔ chance catalog will too. If TIMBER filters it, there is a ⅘ chance catalog will too.

In some situations, using the catalog retains more child-parent match agreement (but disagreement is more a matching problem than a filtering problem). By adjusting the minimum match threshold, the catalog filters may remove more matches than TIMBER.

There are many haplotypes in the catalog that have strong statistical connections to certain ethnicity populations.

Even with a simplified version of the haplotype features (using 80K of 1.4 M, the most frequent 5-6% of haplotypes), a significant number of community assignments can be predicted from haplotype features only (looking at ROC curves).

Computing Machine Architecture

Figure 6:
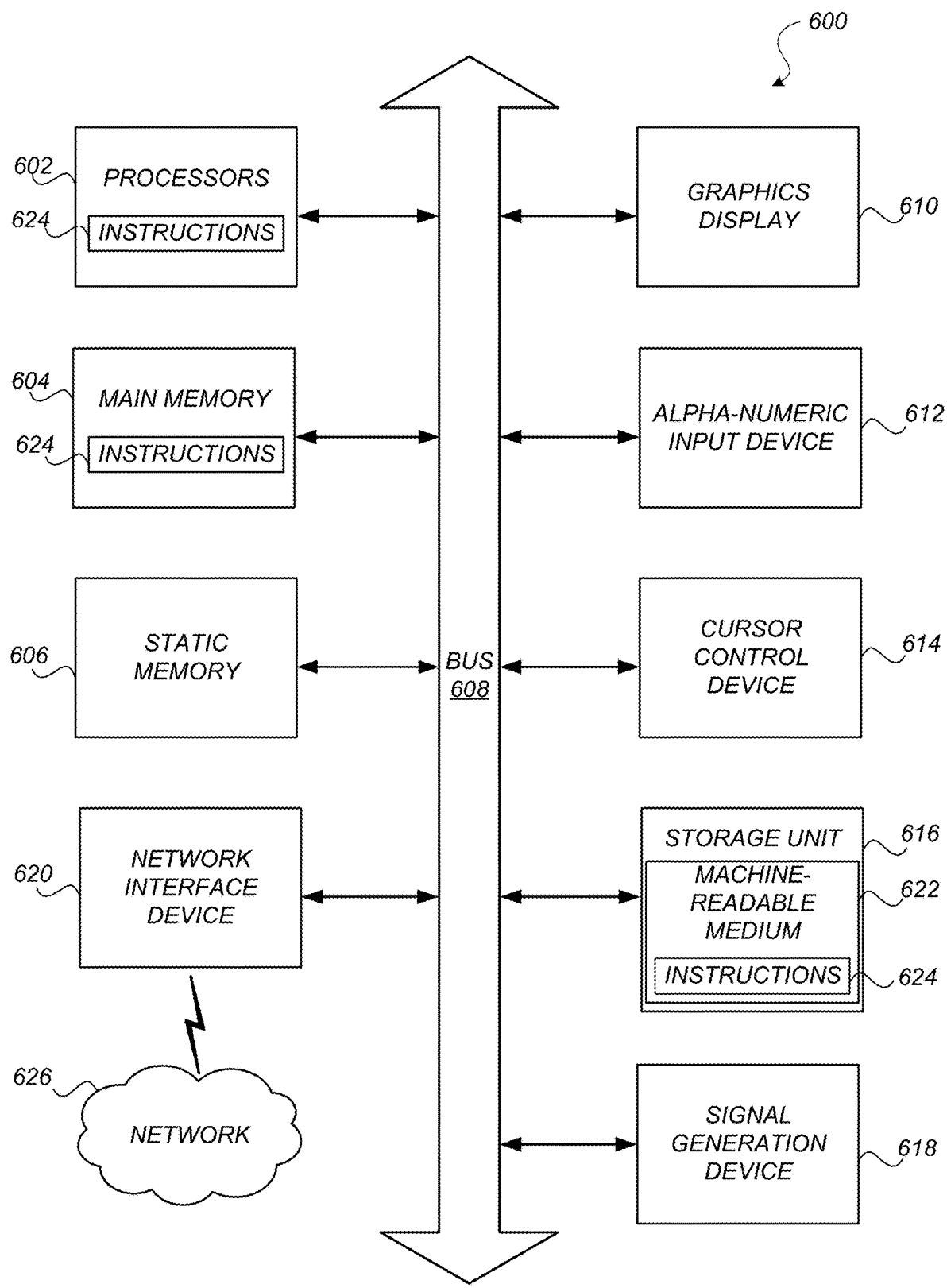
FIG. 6 is a block diagram of an example computing device, in accordance with some embodiments.

FIG. 6 is a block diagram illustrating components of an example computing machine that is capable of reading instructions from a computer-readable medium and executing them in a processor (or controller). A computer described herein may include a single computing machine shown in FIG. 6, a virtual machine, a distributed computing system that includes multiple nodes of computing machines shown in FIG. 6, or any other suitable arrangement of computing devices.

By way of example, FIG. 6 shows a diagrammatic representation of a computing machine in the example form of a computer system 600 within which instructions 624 (e.g., software, source code, program code, expanded code, object code, assembly code, or machine code), which may be stored in a computer-readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 6 may correspond to any software, hardware, or combined components shown in FIGS. 1 and 2, including but not limited to, the client device 110, the computing server 130, and various engines, interfaces, terminals, and machines shown in FIG. 2. While FIG. 6 shows various hardware and software elements, each of the components described in FIGS. 1 and 2 may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 624 that specify actions to be taken by that machine. Further, while only a single machine is illustrated, the term "machine" and "computer" may also be taken to include any collection of machines that individually or jointly execute instructions 624 to perform any one or more of the methodologies discussed herein.

The example computer system 600 includes one or more processors 602 such as a CPU (central processing unit), a GPU (graphics processing unit), a TPU (tensor processing unit), a DSP (digital signal processor), a system on a chip (SOC), a controller, a state equipment, an application-specific integrated circuit (ASIC), a field-programmable gate array (FPGA), or any combination of these. Parts of the computing system 600 may also include a memory 604 that store computer code including instructions 624 that may cause the processors 602 to perform certain actions when the instructions are executed, directly or indirectly by the processors 602. Instructions can be any directions, commands, or orders that may be stored in different forms, such as equipment-readable instructions, programming instructions including source code, and other communication signals and orders. Instructions may be used in a general sense and are not limited to machine-readable codes. One or more steps in various processes described may be performed by passing through instructions to one or more multiply-accumulate (MAC) units of the processors.

One and more methods described herein improve the operation speed of the processors 602 and reduces the space required for the memory 604. For example, the database processing techniques, such as processes 300 and 450, described herein reduce the complexity of the computation of the processors 602 by applying one or more novel techniques that simplify the steps in computation and generating results of the processors 602. The algorithms described herein also reduces the size of the models and datasets to reduce the storage space requirement for memory 604.

The performance of certain operations may be distributed among more than one processor, not only residing within a single machine, but deployed across a number of machines. In some example embodiments, the one or more processors or processor-implemented modules may be located in a single geographic location (e.g., within a home environment, an office environment, or a server farm). In other example embodiments, one or more processors or processor-implemented modules may be distributed across a number of geographic locations. Even though in the specification or the claims may refer some processes to be performed by a processor, this should be construed to include a joint operation of multiple distributed processors. In some embodiments, a computer-readable medium comprises one or more computer-readable media that, individually, together, or distributedly, comprise instructions that, when executed by one or more processors, cause the one or more processors to perform, individually, together, or distributedly, the steps of the instructions stored on the one or more computer-readable media. Similarly, a processor comprises one or more processors or processing units that, individually, together, or distributedly, perform the steps of instructions stored on a computer-readable medium. In various embodiments, the discussion of one or more processors that carry out a process with multiple steps does not require any one of the processors to carry out all of the steps. For example, a processor A can carry out step A, a processor B can carry out step B using, for example, the result from the processor A, and a processor C can carry out step C, etc. The processors may work cooperatively in this type of situations such as in multiple processors of a system in a chip, in Cloud computing, or in distributed computing.

The computer system 600 may include a main memory 604, and a static memory 606, which are configured to communicate with each other via a bus 608. The computer system 600 may further include a graphics display unit 610 (e.g., a plasma display panel (PDP), a liquid crystal display (LCD), a projector, or a cathode ray tube (CRT)). The graphics display unit 610, controlled by the processors 602, displays a graphical user interface (GUI) to display one or more results and data generated by the processes described herein. The computer system 600 may also include alphanumeric input device 612 (e.g., a keyboard), a cursor control device 614 (e.g., a mouse, a trackball, a joystick, a motion sensor, or other pointing instruments), a storage unit 616 (a hard drive, a solid-state drive, a hybrid drive, a memory disk, etc.), a signal generation device 618 (e.g., a speaker), and a network interface device 620, which also are configured to communicate via the bus 608.

The storage unit 616 includes a computer-readable medium 622 on which is stored instructions 624 embodying any one or more of the methodologies or functions described herein. The instructions 624 may also reside, completely or at least partially, within the main memory 604 or within the processor 602 (e.g., within a processor's cache memory) during execution thereof by the computer system 600, the main memory 604 and the processor 602 also constituting computer-readable media. The instructions 624 may be transmitted or received over a network 626 via the network interface device 620.

While computer-readable medium 622 is shown in an example embodiment to be a single medium, the term "computer-readable medium" should be taken to include a single medium or multiple media (e.g., a centralized or distributed database, or associated caches and servers) able to store instructions (e.g., instructions 624). The computer-readable medium may include any medium that is capable of storing instructions (e.g., instructions 624) for execution by the processors (e.g., processors 602) and that cause the processors to perform any one or more of the methodologies disclosed herein. The computer-readable medium may include, but not be limited to, data repositories in the form of solid-state memories, optical media, and magnetic media. The computer-readable medium does not include a transitory medium such as a propagating signal or a carrier wave.

EXAMPLE EMBODIMENTS

Embodiment 1

A computer-implemented method, comprising: generating a catalog of overrepresented haplotypes from a plurality of genetic datasets of sampled individuals, wherein an overrepresented haplotype is a haplotype that exists in a number of sampled individuals and the number exceeds a number threshold; receiving a genetic dataset of a target individual; determining one or more shared identity-by-descent (IBD) haplotypes in the genetic dataset of the target individual that are shared with a related individual, the shared IBD haplotypes excluding the overrepresented haplotypes; determining a total length of the shared IBD haplotypes excluding the overrepresented haplotypes; and outputting, responsive to the total length longer than a length threshold, information regarding the shared IBD haplotypes.

Embodiment 2

The computer-implemented method of embodiment 1, wherein the overrepresented haplotypes in the catalog are arranged by windows of genomic locality within which the overrepresented haplotypes are located.

Embodiment 3

The computer-implemented method of embodiment 2, wherein the catalog comprises a plurality of nucleotide sequences of overrepresented haplotypes in one of the windows of genomic locality.

Embodiment 4

The computer-implemented method of embodiment 1, wherein generating the catalog comprises: receiving the plurality of genetic datasets of the sampled individuals, wherein the genetic datasets are phased haplotypes; dividing each genetic dataset into a plurality of windows of genomic locality; tallying, for each window, the phased haplotypes that have a particular sequence; and determining whether a tally of the particular sequence exceeding the number threshold.

Embodiment 5

The computer-implemented method of embodiment 1, wherein the information regarding the shared IBD haplotypes includes the total length and an indication that the target individual and related individual are IBD-related.

Embodiment 6

The computer-implemented method of embodiment 1, wherein the catalog is generated before receiving the genetic dataset of the target individual and is stored in a database.

Embodiment 7

The computer-implemented method of embodiment 1, wherein determining the one or more shared IBD haplotypes in the genetic dataset of the target individual comprises:

dividing the genetic dataset of the target individual into a plurality of windows of genomic locality; receiving, from the catalog, a subset of the windows that include the overrepresented haplotypes; and comparing the genetic datasets of the target individual and the related individual in the windows that are not under the subset.

Embodiment 8

The computer-implemented method of embodiment 1, wherein determining the one or more shared IBD haplotypes in the genetic dataset of the target individual comprises: comparing the genetic datasets of the target individual and the related individual to generate candidate shared IBD haplotypes; retrieving the overrepresented haplotypes from the catalog; and removing the candidate shared IBD haplotypes that are the overrepresented haplotypes.

Embodiment 9

The computer-implemented method of embodiment 1, wherein determining the one or more shared IBD haplotypes in the genetic dataset of the target individual comprises: phasing the genetic dataset of the target individual into a pair of haplotype datasets; comparing the pair of haplotype datasets with haplotype datasets of the related individual.

Embodiment 10

The computer-implemented method of embodiment 1, wherein the plurality of genetic datasets comprises genetic datasets of over 10,000 sampled individuals.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Any feature mentioned in one claim category, e.g. method, can be claimed in another claim category, e.g. computer program product, system, storage medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject matter may include not only the combinations of features as set out in the disclosed embodiments but also any other combination of features from different embodiments. Various features mentioned in the different embodiments can be combined with explicit mentioning of such combination or arrangement in an example embodiment or without any explicit mentioning. Furthermore, any of the embodiments and features described or depicted herein may be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof Any of the steps, operations, or processes described herein may be performed or implemented with one or more hardware or software engines, alone or in combination with other devices. In some embodiments, a software engine is implemented with a computer program product comprising a computer-readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed in the specific order claimed or described in the disclosure. Some steps may be performed before others even though the other steps are claimed or described first in this disclosure. Likewise, any use of (i), (ii), (iii), etc., or (a), (b), (c), etc. in the specification or in the claims, unless specified, is used to better enumerate items or steps and also does not mandate a particular order.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A. In claims, the use of a singular form of a noun may imply at least one element even though a plural form is not used.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

The following applications are incorporated by reference in their entirety for all purposes: (1) U.S. Pat. No. 10,679,729, entitled "Haplotype Phasing Models," granted on June 9, 2020, (2) U.S. Pat. No. 10,223,498, entitled "Discovering Population Structure from Patterns of Identity-By-Descent," granted on Mar. 5, 2019, (3) U.S. Pat. No. 10,720,229, entitled "Reducing Error in Predicted Genetic Relationships," granted on Jul. 21, 2020, (4) U.S. Pat. No. 10,558,930, entitled "Local Genetic Ethnicity Determination System," granted on Feb. 11, 2020, (5) U.S. Pat. No. 10,114,922, entitled "Identifying Ancestral Relationships Using a Continuous Stream of Input," granted on Oct. 30, 2018, (6)

U.S. Pat. No. 11,429,615, entitled "Linking Individual Datasets to a Database," granted on Aug. 30, 2022, (7) U.S. Pat. No. 10,692,587, entitled "Global Ancestry Determination System," granted on Jun. 23, 2020, and (8) U.S. Patent Application Publication No. US 2021/0034647, entitled "Clustering of Matched Segments to Determine Linkage of Dataset in a Database," published on Feb. 4, 2021.

What is claimed is:

1. A computer-implemented method for determining a normalized data inheritance between two data instances, the computer-implemented method comprising:
   generating a catalog of overrepresented haplotypes from a database that stores a plurality of data instances in a population, wherein an overrepresented haplotype is a haplotype that matches to a number of data instances in the population and the number exceeds a number threshold, wherein the catalog of overrepresented haplotypes comprises a version of haplotype string sequences and corresponding tallies of the haplotype string sequences in the population, and wherein the number threshold is based on an overall distribution of haplotype sequence repetitiveness;
   receiving a target data instance that is to be compared to a related data instance;
   determining one or more matched haplotypes that match between the target data instance and the related data instance;
   comparing the one or more matched haplotypes to the catalog of overrepresented haplotypes to exclude a subset of the one or more matched haplotypes that are matched to the overrepresented haplotypes;
   determining a normalized data inheritance between the target data instance and the related data instance, the normalized data inheritance corresponding to a total length of the one or more matched haplotypes excluding the subset of the one or more matched haplotypes that are matched to the overrepresented haplotypes; and
   storing, responsive to the total length being longer than a length threshold, information regarding the target data instance and the related data instance being a pair of identity-by-descent matches.

2. The computer-implemented method of claim 1, wherein the overrepresented haplotypes in the catalog are arranged by windows of data locality within which the overrepresented haplotypes are located.

3. The computer-implemented method of claim 2, wherein the catalog comprises a plurality of overrepresented haplotypes in one of the windows of data locality.

4. The computer-implemented method of claim 1, wherein generating the catalog comprises:
   receiving the plurality of data instances that correspond to named entities, wherein each of the plurality of data instances is phased;
   dividing each data instance into a plurality of windows of data locality;
   tallying, for each window of data locality, the data instance that has a particular data bit sequence; and
   determining whether a tally of the particular data bit sequence exceeds the number threshold.

5. The computer-implemented method of claim 1, wherein information regarding the target data instance and the related data instance being a pair of matches includes the total length and an indication that the target data instance and the related data instance are related by inheritance of a real-life event.

6. The computer-implemented method of claim 1, wherein the catalog is generated before receiving the target data instance and is stored in a second database.

7. The computer-implemented method of claim 1, wherein comparing the matched haplotypes to the catalog to exclude the subset of matched haplotypes that are matched to the overrepresented haplotypes comprises:
   dividing the target data instance into a plurality of windows of data locality;
   receiving, from the catalog, a subset of the windows of data locality that include the overrepresented haplotypes; and
   comparing the target data instance and the related data instance in the windows that are not under the subset.

8. The computer-implemented method of claim 1, wherein determining one or more matched haplotypes that match between the target data instance and the related data instance is based on one or more weak matches of haplotypes.

9. The computer-implemented method of claim 1, wherein determining one or more matched haplotypes that match between the target data instance and the related data instance comprises:
   phasing the target data instance into a pair of data sequences;
   comparing the pair of data sequences with data sequences in the related data instance.

10. The computer-implemented method of claim 1, wherein the database that stores the plurality of data instances comprises over 10,000 data instances and each data instance includes over 10,000 data bits.

11. A system for determining a normalized data inheritance between two data instances, the system comprising:
   a data store configured to store a catalog of overrepresented haplotypes among a plurality of data instances in a population, wherein an overrepresented haplotype is a haplotype that matches to a number of data instances in the population and the number exceeds a number threshold, wherein the catalog of overrepresented haplotypes comprises a version of haplotype string sequences and corresponding tallies of the haplotype string sequences in the population, and wherein the number threshold is based on an overall distribution of haplotype sequence repetitiveness;
   a computing server comprising memory and one or more processors, the memory configured to store code comprising instructions, wherein the instructions, when executed by the one or more processors, cause the one or more processors to perform steps comprising:
      receiving a target data instance that is to be compared to a related data instance;
      determining one or more matched haplotypes that match between the target data instance and the related data instance;
      comparing the one or more matched haplotypes to the catalog of overrepresented haplotypes to exclude a subset of the one or more matched haplotypes that are matched to the overrepresented haplotypes;
      determining a normalized data inheritance between the target data instance and the related data instance, the normalized data inheritance corresponding to a total length of the one or more matched haplotypes excluding the subset of the one or more matched haplotypes that are matched to the overrepresented haplotypes; and
      storing, responsive to the total length being longer than a length threshold, information regarding the target data instance and the related data instance being a pair of identity-by-descent matches.

12. The system of claim 11, wherein the overrepresented haplotypes in the catalog are arranged by windows of data locality within which the overrepresented haplotypes are located.

13. The system of claim 12, wherein the catalog comprises a plurality of overrepresented haplotypes in one of the windows of data locality.

14. The system of claim 11, wherein generating the catalog comprises:
receiving the plurality of data instances that correspond to named entities, wherein each of the plurality of data instances is phased;
dividing each data instance into a plurality of windows of data locality;
tallying, for each window, the phased data instance that has a particular data bit sequence; and
determining whether a tally of the particular data bit sequence exceeds the number threshold.

15. The system of claim 11, wherein information regarding the target data instance and the related data instance being a pair of match includes the total length and an indication that the target data instance and the related data instance are related by inheritance of a real-life event.

16. The system of claim 11, wherein the catalog is generated before receiving the target data instance and is stored in a second database.

17. The system of claim 11, wherein comparing the matched haplotypes to the catalog to exclude the subset of matched haplotypes that are matched to the overrepresented haplotypes comprises:
dividing the target data instance into a plurality of windows of data locality;
receiving, from the catalog, a subset of the windows that include the overrepresented haplotypes; and
comparing the target data instance and the related data instance in the windows that are not under the subset.

18. The system of claim 11, wherein determining one or more matched haplotypes that match between the target data instance and the related data instance is based on one or more weak matches of haplotypes.

19. A non-transitory computer readable medium configured to store code for determining a normalized data inheritance between two data instances, the code comprising instructions, wherein the instructions, when executed by one or more processors, cause the one or more processors to perform steps comprising:
generating a catalog of overrepresented haplotypes from a database that stores a plurality of data instances in a population, wherein an overrepresented haplotype is a haplotype that matches to a number of data instances in the population and the number exceeds a number threshold, wherein the catalog of overrepresented haplotypes comprises a version of haplotype string sequences and corresponding tallies of the haplotype string sequences in the population, and wherein the number threshold is based on an overall distribution of haplotype sequence repetitiveness;
receiving a target data instance that is to be compared to a related data instance;
determining one or more matched haplotypes that match between the target data instance and the related data instance;
comparing the one or more matched haplotypes to the catalog of overrepresented haplotypes to exclude a subset of the one or more matched haplotypes that are matched to the overrepresented haplotypes;
determining a normalized data inheritance between the target data instance and the related data instance, the normalized data inheritance corresponding to a total length of the one or more matched haplotypes excluding the subset of the one or more matched haplotypes that are matched to the overrepresented haplotypes; and
storing, responsive to the total length being longer than a length threshold, information regarding the target data instance and the related data instance being a pair of identity-by-descent matches.

20. The non-transitory computer readable medium of claim 19, wherein the overrepresented haplotypes in the catalog are arranged by windows of data locality within which the overrepresented haplotypes are located.

* * * * *